United States Patent [19]
Wilcox

[11] Patent Number: 6,097,391
[45] Date of Patent: Aug. 1, 2000

[54] METHOD AND APPARATUS FOR GRAPHICALLY MANIPULATING OBJECTS

[75] Inventor: Jonathan J. Wilcox, Woodside, Calif.

[73] Assignee: Menai Corporation, Menlo Park, Calif.

[21] Appl. No.: 08/829,588

[22] Filed: Mar. 31, 1997

[51] Int. Cl.[7] .................................................. G06F 3/00
[52] U.S. Cl. ........................ 345/350; 345/335; 345/348
[58] Field of Search .................................. 345/326, 333, 345/340, 348, 350, 145, 335, 349; 395/680, 683; 707/539

[56] References Cited

U.S. PATENT DOCUMENTS

| | | | |
|---|---|---|---|
| 4,868,765 | 9/1989 | Diefendorff | 345/345 |
| 5,313,575 | 5/1994 | Beethe | 345/356 |
| 5,367,623 | 11/1994 | Iwai et al. | 345/350 |
| 5,404,442 | 4/1995 | Foster et al. | 345/348 |
| 5,416,901 | 5/1995 | Torres | 345/348 |
| 5,428,776 | 6/1995 | Rothfield | 345/348 |
| 5,502,805 | 3/1996 | Anderson et al. | 707/503 |
| 5,506,952 | 4/1996 | Choy et al. | 345/348 |
| 5,548,702 | 8/1996 | Li et al. | 345/346 |
| 5,561,758 | 10/1996 | Hocker et al. | 345/348 |
| 5,572,644 | 11/1996 | Liaw et al. | 707/531 |
| 5,572,651 | 11/1996 | Weber et al. | 345/326 |
| 5,574,909 | 11/1996 | Misono et al. | 707/1 |
| 5,581,686 | 12/1996 | Koppolu et al. | 345/340 |
| 5,583,984 | 12/1996 | Conrad et al. | 345/340 |
| 5,598,524 | 1/1997 | Johnston, Jr. et al. | 345/348 |
| 5,634,095 | 5/1997 | Wang et al. | 345/326 |
| 5,664,127 | 9/1997 | Anderson et al. | 345/333 |
| 5,668,960 | 9/1997 | Kataoka | 345/333 |
| 5,668,964 | 9/1997 | Helsel et al. | 345/350 |
| 5,678,014 | 10/1997 | Malamud et al. | 345/333 |
| 5,710,897 | 1/1998 | Schneider | 345/350 |
| 5,745,718 | 4/1998 | Cline et al. | 345/352 |

OTHER PUBLICATIONS

Moseley, Lonnie; Mastering Office 97, Sybex, pp. 428, 429, 452 and 453, Dec. 13, 1996.
J. Gavron and J. Moran, How to Use Microsoft Windows NT 4 Workstation, Ziff Davis Press, pp. 12–13, 1996.

*Primary Examiner*—Raymond J. Bayerl
*Assistant Examiner*—David E. Brown
*Attorney, Agent, or Firm*—The Hecker Law Group

[57] ABSTRACT

The invention provides an improved user interface component comprising a set of icons, called Zframes, that correspond to each page in a tabbed notebook. Objects can be copied, moved, or displayed using the Zframes. When a user drags an object off the client surface of an exposed page and drops it into one of the Zframes, the object is moved to the page that corresponds to the Zframe. When an object is dropped into a Zframe it is displayed only as long as the user holds the mouse button down. When a user depresses the mouse button when pointing to a Zframe the corresponding page is displayed while the mouse button is depressed. Links between objects on the exposed page of the tabbed notebook are illustrated using link lines. Links from an object contained in the exposed page to objects on other pages can be illustrated by displaying rings within Zframes that correspond to pages that contain objects linked to a selected object. The rings are removed when the object is released.

17 Claims, 28 Drawing Sheets

METHOD AND APPARATUS FOR GRAPHICALLY MANIPULATING OBJECTS

BACKGROUND OF THE INVENTION

1. Field of the Invention

This invention relates to the field of information processing, and more specifically to a graphical user interface for a computer.

2. Background Art

Tabbed notebook user interfaces are modeled on the conventional paper version of a tabbed notebook. A tabbed notebook interface comprises a plurality of pages with corresponding tabs. Prior art tabbed notebooks fail to take full advantage of the capabilities provided by computer systems. Typically tabbed notebook interfaces simply imitate the paper type tabbed notebook. The following background information is presented to provide a better understanding of this problem.

Graphical User Interfaces (GUIs) generally provide computer users with methods of controlling a computer that are more intuitive than text based methods. One example of a graphical user interface is the tabbed notebook. FIG. 2 illustrates a prior art tabbed notebook. A tabbed notebook display typically comprises a single page along with a plurality of small tabs representing other pages in the tabbed notebook. To move to another page a user can use a pointing device, such as a mouse, to click on the tab for the desired page and that page will then be displayed.

In a database application the pages of a tabbed notebook can be used to represent database records. For convenience, a user may want to copy data to another record without having to change the record that is displayed. A typical method for copying information from one record to another record is for a user to copy the information to an electronic clipboard, change the display to the destination page, and paste the information on the destination page. To return to the page of origin the user may have to remember what page the information came from, then select the tab corresponding to that page, or perhaps alternatively return to the page of origin using a series of keyboard commands. Therefore requiring users to change the displayed record to copy information is inefficient because it requires users to perform superfluous steps and introduces unnecessary difficulties for users. Similar problems exist in any embodiments of tabbed or multi-page notebook interfaces in which objects on one page may be moved to another, such as spreadsheet cells that can be moved from a spreadsheet on an exposed page to a spreadsheet on a hidden page. A further problem with the clipboard approach to moving or copying objects between pages of a tabbed notebook is that a typical tabbed notebook interface does not provide any visual confirmation of what task was performed. For example, there is typically no indication of whether the object was moved or copied, nor is there an indication of the source of origin of the object.

Thus, there is a need for an improved graphical user interface to provide an intuitive method of manipulating objects.

The following references describe a variety of technologies related to graphical user interfaces:

In U.S. Pat. No. 5,416,901, Torres describes a system for facilitating direct icon manipulation operations in a data processing system. A selection icon is generated which corresponds to an operator's selection of data fields from a plurality of data fields. The selection icon may be applied to a particular category of software objects to automatically include or exclude selected data fields in a direct icon manipulation operation, such as a drag-and-drop operation.

In U.S. Pat. No. 5,367,623, Iwai describes an information processing apparatus that has a capability of opening two or more windows and processing an object such as text, graphics, or a picture on each page. This information processing unit includes a pasting unit for pasting a tag window at any location on each page, a registering unit for registering one or more objects in the tag window, and a linking unit for linking the page to the tag window or unlinking the tag window from the page.

In U.S. Pat. No. 5,502,805, Anderson describes an electronic spreadsheet system that includes a notebook interface having a plurality of notebook pages, each of which may contain a spread of information cells, or other desired page type (e.g. Graphs page). Methods are provided for rapidly accessing and processing information on the different pages, including displaying a plurality of page identifiers for selecting individual pages, and further including a preferred syntax for referencing information. Additional methods are provided for editing cells and blocks of cells.

In U.S. Pat. No. 5,572,644, Liaw describes a system for allocating memory to store a multi-dimensional spread of information in an electronic spreadsheet system including a notebook interface having a plurality of notebook pages, each of which may contain a spread of information cells, or other desired page type (e.g. Graphs page). Methods are provided for rapidly accessing and processing information on the different pages, including displaying a plurality of page identifiers for selecting individual pages, and further including a preferred syntax for referencing information. Additional methods are described for in-memory management and persistent storage of notebooks and their pages.

In U.S. Pat. No. 5,506,952, Choy describes a system for guiding the formation of a correctly structured instruction for data processing systems. A set of components relating to elements and actions used to formulate the instructions is provided to visually represent the elements and actions. The components are displayed as icons. An instruction is constructed by moving selected icons into a rule construction area. A selection of components that may correctly be inserted into the instruction is provided at each stage of construction of the instruction. Components that may not correctly be inserted into the instruction are disabled. The disabled icons are visually provided as "grayed" icons. As the instruction is developed with additional icons, the selection of correct components changes to correspond to the changing instruction.

In U.S. Pat. No. 5,583,984, Conrad describes a computer system with a graphical user interface that allows the user to open and close enclosures, while dragging an object. When the user pauses, gestures, or rolls over a hot spot on top of an icon or text representing a closed enclosure, a temporary window for the closed enclosure is "sprung open" to allow the user to browse inside the enclosure and possibly open another enclosure contained within the temporary window. This process can be carried on throughout a hierarchy of windows as the user browses for a destination window for the drag operation. All of the temporary windows except the destination are closed when the mouse button is released, signaling the end of a drag. The user may close sprung open windows by moving the cursor out of the sprung open window, or by making some other gesture. If an enclosure to be sprung open was previously open on the desktop, the previously opened window may zoom over to the current mouse position, and then return to its original position when the user mouse is out of the window.

In U.S. Pat. No. 5,581,686, Koppolu describes a system for interacting with a containee object contained within a container object. The container object has a container application with a container window environment that has container resources for interacting with the container object. The containee object has a server application with a server window environment with server resources for interacting with the containee object. The method of the invention displays the container window environment on a display device. A user then selects the containee object. In response to selecting the containee object, the method integrates a plurality of the server resources with the displayed container window environment. When a user then selects a server resource, the method invokes the server application to process the server resource selection. Conversely, when a user selects a container resource, the method invokes the container application to process the container resource selection.

In U.S. Pat. No. 5,404,442, Foster describes a visible clipboard for graphical computer environments. In the Foster system text, graphics, or other selected objects of a computer screen are selected and converted into a "visual clipboard" which is attached to a boundary of the screen. The visible clipboard is preferably implemented on a pen-based computer system where the object is selected by a stylus, is dragged to a boundary, and is converted to a clipboard icon at the boundary. Multiple clipboard icons may be produced by the user, and can be moved from one boundary location to another. The contents of the clipboard can be inserted or "pasted" into an application program by dragging the clipboard icon with the stylus to the desired insertion location. Preferably, each clipboard is provided with indicia representative of the contents of the clipboard.

In U.S. Pat. No. 5,574,909, Misono describes a system for data searching using selected or representative data samples. Representative samples among a group of data to be searched are displayed, and two displayed representative samples are selected to specify a new area of data to be searched. The portion of the data is bracketed and narrowed down, to facilitate finding the desired data item.

In U.S. Pat. No. 5,572,651, Weber describes a table-based user interface for retrieving and manipulating indices between data structures, with particular application to handwriting based user interfaces. The user-interactive method provides a user with the capability to retrieve and manipulate associations previously established among image segments in a single or in multiple data structures, where the image segments are stored as image data. The use of certain designated image segments, called key objects, for association with one or more other stored image segments in effect imposes a user-defined categorization structure on the image segments with which key objects are associated, producing groups of image segments associated with respective key objects. The categorized information for a particular key object is retrievable and displayable with the key object image providing an indexing mechanism into the image data. Multiple groupings of categorized information may be presented in a tabular format, showing the relationship between key objects and image segments, and the tabular presentation may be used as a user interface for the post-creating manipulation and alteration of key object associations in order to further refine or extend the categorizations structure.

In U.S. Pat No. 5,428,776, Rothfield describes a graphical query front end system for querying a relational database displaying the elements of a query in graphical form. The graphical query consists of tables, shown as nodes on a display, used as input to operator nodes, which produce output tables by modifying the inputs based on information provided by the user. There are several operators, each of which represents a different piece of defining a query. These operator nodes may then be used as inputs to operator nodes which modify their inputs to produce output tables, and so on until the desired result is achieved.

In U.S. Pat. No. 4,868,765, Diefendorff describes a porthole window system for computer displays allowing a user to look at a portion of a window which could otherwise not be seen. A porthole window acts as an opening in a window of the usual type through which underlying windows may be seen. A porthole window can have different features as desired, including links to selected source and target windows, real time movement on the display screen, and the ability to be updated when a target window is updated. The porthole system runs concurrently with the normal window handling system of the computer.

In U.S. Pat. No. 5,548,702, Li describes a method for scrolling a target window during a drag and drop operation. When it is determined that a graphical object has hit an interior boundary of a target window the target window is scrolled so long as the graphical object continues to hit the interior boundary.

In U.S. Pat. No. 5,561,758, Hocker describes a process icon based on a tunnel concept in which the icon has an input and an output portal through which an object is dragged in order to invoke a process. The direction of the process invoked (e.g. encrypt to decrypt or decrypt to encrypt) can be denoted and determined by the portal through which the object is dragged.

In U.S. Pat. No. 5,313,575, Beethe describes a processing method for an iconic programming system, wherein each icon within the system may have zero or more data input connections, zero or more data output connections, an optical sequence input connection, and an optional sequence output connection. Each of these connections may be used to graphically connect each icon to another icon to form a network of icons that operates as a computer program. Execution of the network is accomplished by processing each icon and performing any programming functions represented by the icon.

SUMMARY OF THE INVENTION

The invention presents an improved method and apparatus for graphically manipulating objects in a tabbed notebook window environment. The present invention overcomes conceptual obstacles that tend to confuse users of database software and users of software that permits user-controlled movement, sorting and/or assembly of visual elements on a plurality of pages of a multi-page notebook, said notebook optionally having tabs representing the pages. The invention provides a set of icons, called Zframes, each of which corresponds to a page in a tabbed notebook. Objects that have a graphical representation can be copied, moved or displayed using the Zframes. When a user drags an object off the client surface of an exposed page and drops it into one of the Zframes, the object is moved to the page that corresponds to the Zframe. Thus objects can be moved without changing the page displayed on the screen.

When an object is dropped into a Zframe it is displayed as long as the user holds the mouse, or other graphical input control device, button down. When this button is released the object is no longer displayed, indicating that the object has been moved or copied to the destination page.

When a user clicks the mouse button when pointing to a Zframe the corresponding page is displayed while the mouse button is depressed. When the mouse button is released the display is restored to what was being displayed before the button was depressed.

Links between objects on the exposed page of a tabbed notebook are illustrated using link lines. Objects can also be linked to objects contained on other pages, which are not displayed. These links are called hidden links. One approach to illustrating hidden links between objects is to display a ring within Zframes that correspond to pages that contain objects linked to a selected object. The rings are removed when the object is released.

In an alternative approach, objects, contained in pages other than the exposed page, that are linked to a selected object are displayed differently from objects contained in the exposed page. For example, normally hidden linked objects can be displayed using shading or a higher intensity brightness. When the object is released the linked objects that are not contained in the exposed page are removed from the display.

DETAILED DESCRIPTION OF THE INVENTION

Figure 1:
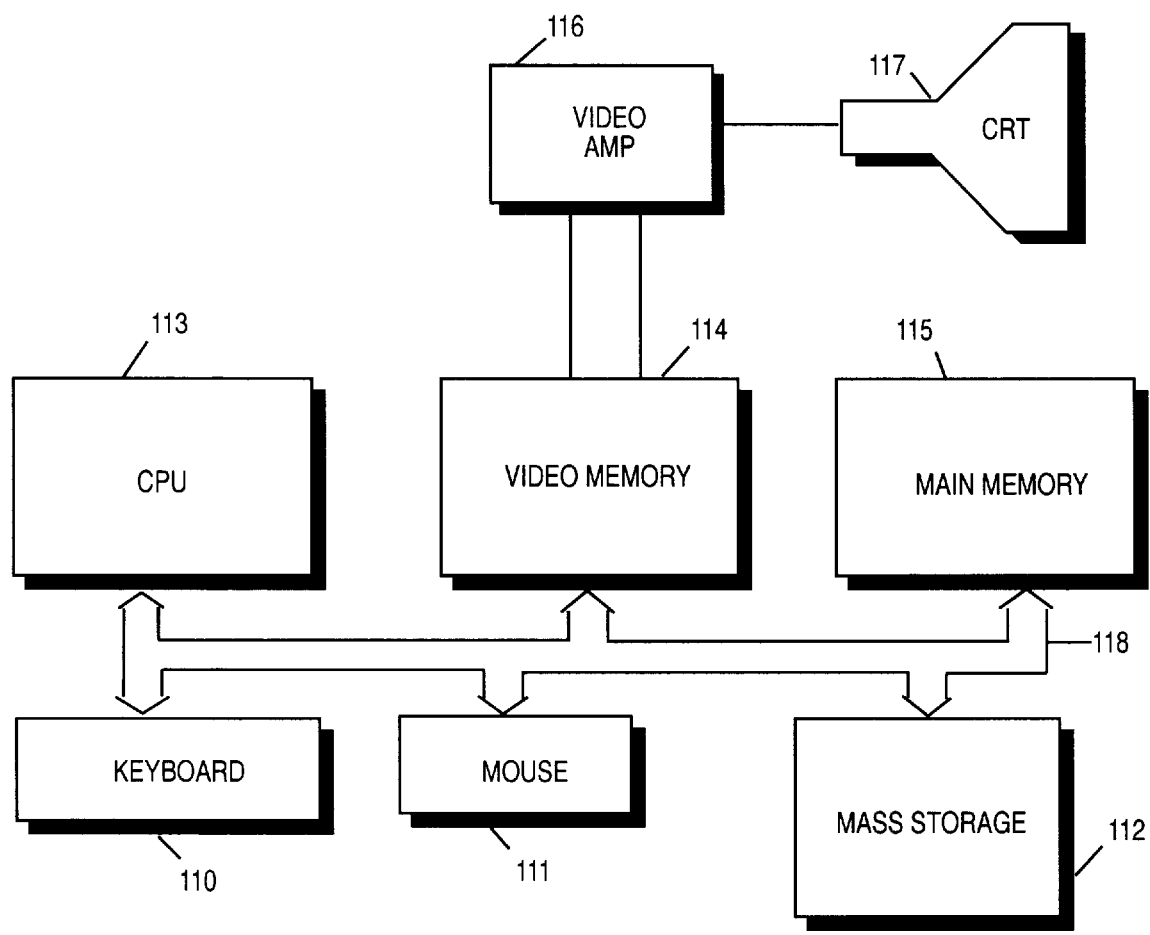
FIG. 1 is a block diagram illustrating a general purpose computer system for implementing the present invention.
Figure 2:
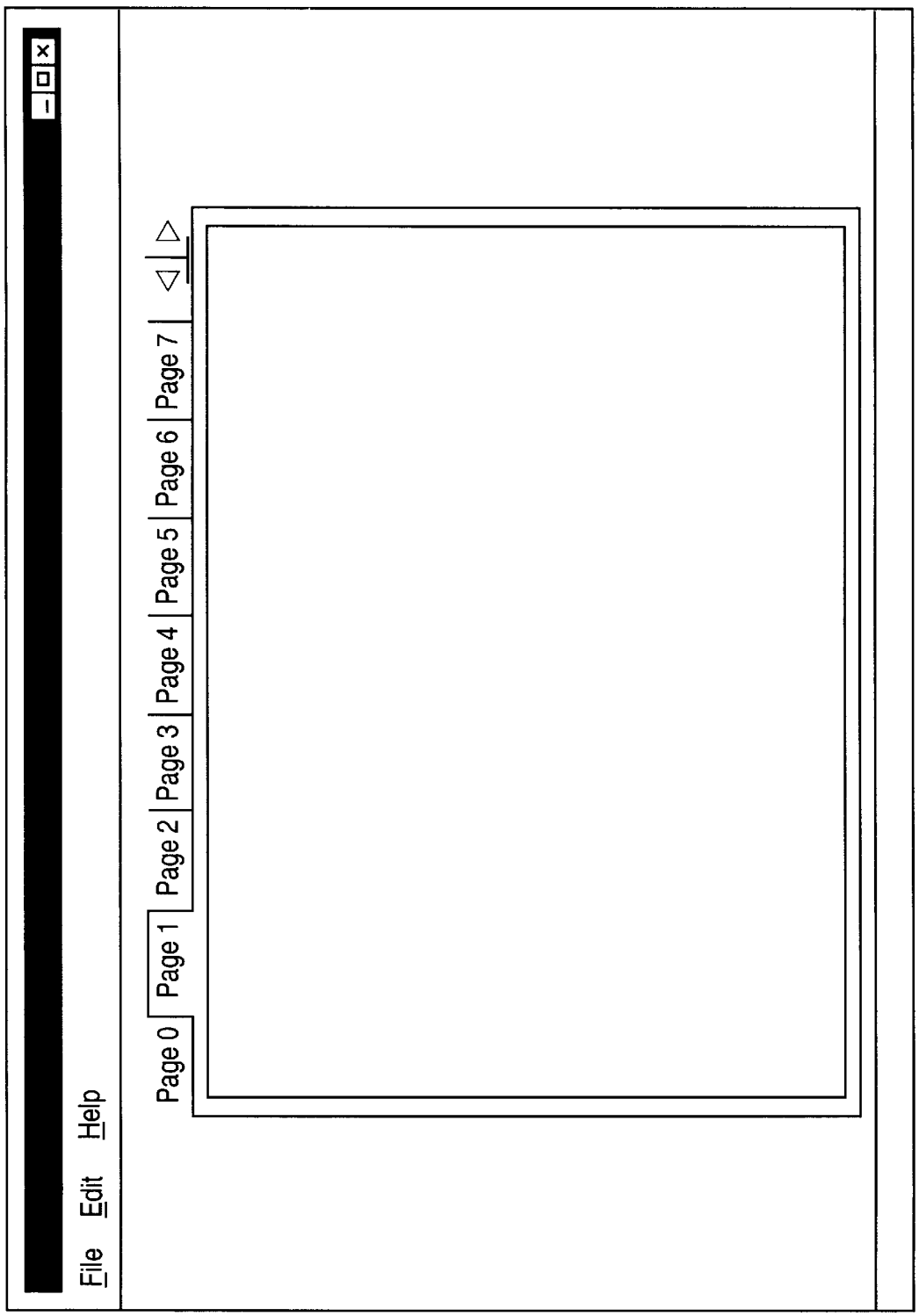
FIG. 2 illustrates a prior art tabbed notebook.

The present invention is directed to a method and apparatus for graphically manipulating objects. In the following description, numerous specific details are set forth to provide a more thorough understanding of the present invention. It will be apparent, however, to one skilled in the art, that the present invention may be practiced without these specific details. In other instances, well-known features have not been described in detail so as not to unnecessarily obscure the present invention.

The present invention is described in the context of an object oriented programming environment. The figures are generally directed to an embodiment in a message passing architecture, for example Windows® 95. The following background on Windows 95 describes features that are important to understand the flow diagrams describing the operation of the present invention. The Windows 95 operating system maintains a "message queue" for each Windows program running under Windows. When an input event occurs, Windows translates the event into a "message" that it places in the program's message queue. Messages can be either "queued" or "nonqueued." The queued messages are placed in a program's message queue by Windows and retrieved and dispatched in the message loop. The dispatched message may invoke a graphical or non-graphical routine when received by an appropriate window or other program element. The nonqueued messages are sent to the window or to a routine directly. For example, if a user clicks, with a user input device, on the window maximize button on the screen display, Windows sends a message to the application program indicating the new window size. The present invention can also be used in other operating systems that support a graphical user interface including Mac® OS, and UNIX.

In the present invention to execute a predefined task outside of the main program, the program sends a message to an event queue. The message contains information identifying another routine that performs the desired task, and the parameters required by that routine. The issuing routine then continues to execute its code. At some later time program control is directed to a procedure that monitors the event queue. The control program directs the message to the destination routine, which then executes the event. The present invention can also be implemented using other program control techniques including, for example, function calls or procedure calls.

In the description of the following flow diagrams user input is generally described using an input device such as a mouse with a right and a left input button. As is well known by those of ordinary skill in the art, other types of user input devices may also be used including, for example, keyboards, trackballs, and touch pads. Also, the term "object" is used to refer to an entity in a tabbed notebook The term therefore has a more expansive meaning than the term "object" has in a limited object oriented programming context.

Computer System

FIG. 1 is a block diagram illustrating an example of one embodiment of a general purpose computer system for implementing the present invention. A keyboard 110 and mouse 111 are coupled to a bi-directional system bus 118. The keyboard and mouse are for introducing user input to the computer system and communication that user input to CPU 113. The computer system of FIG. 1 also includes video memory 114, main memory 115 and mass storage 112, all coupled to bi-directional system bus 118 along with keyboard 110, mouse 111 and CPU 113. The mass storage unit 112 may include both fixed and removable media, such as magnetic, optical or magnetic optical storage systems or any other available mass storage technology. The mass storage may be shared on a network, or it may be dedicated mass storage. Bus 118 may contain, for example, 32 address lines for addressing video memory 114 or main memory 115. System bus 118 also includes, for example, a 32-bit data bus for transferring data between and among the components, such as CPU 113, main memory 115, video memory 114 and mass storage 112. Alternatively, multiplex data/address lines may be used instead of separate data and address lines.

The computer system described above is for purposes of example only. The present invention may be implemented in any of a wide variety of types of computer systems or programming or processing environments.

Overview

Figure 3A:
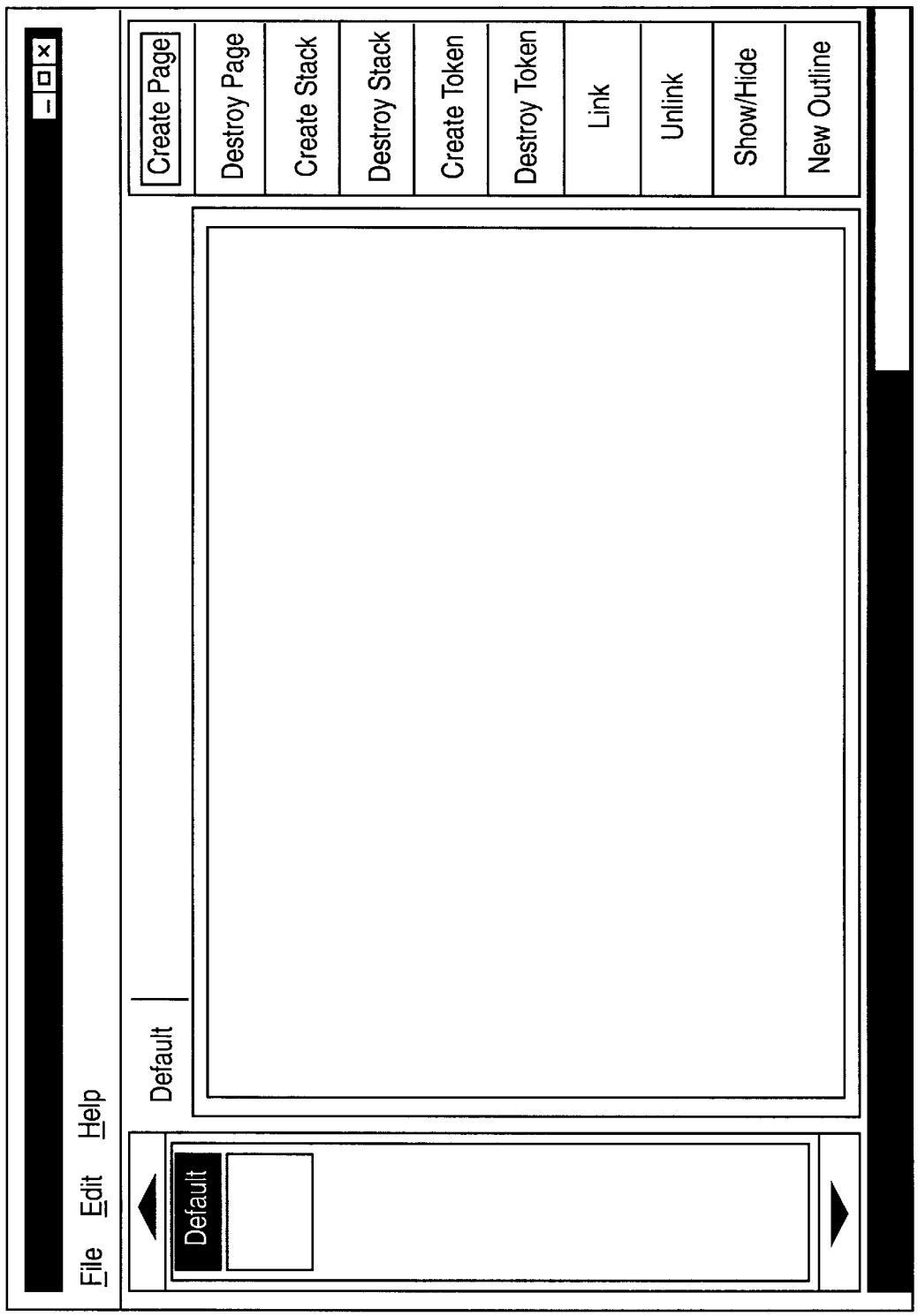
FIG. 3A illustrates a tabbed notebook with one page according to one embodiment of the present invention.
Figure 3B:
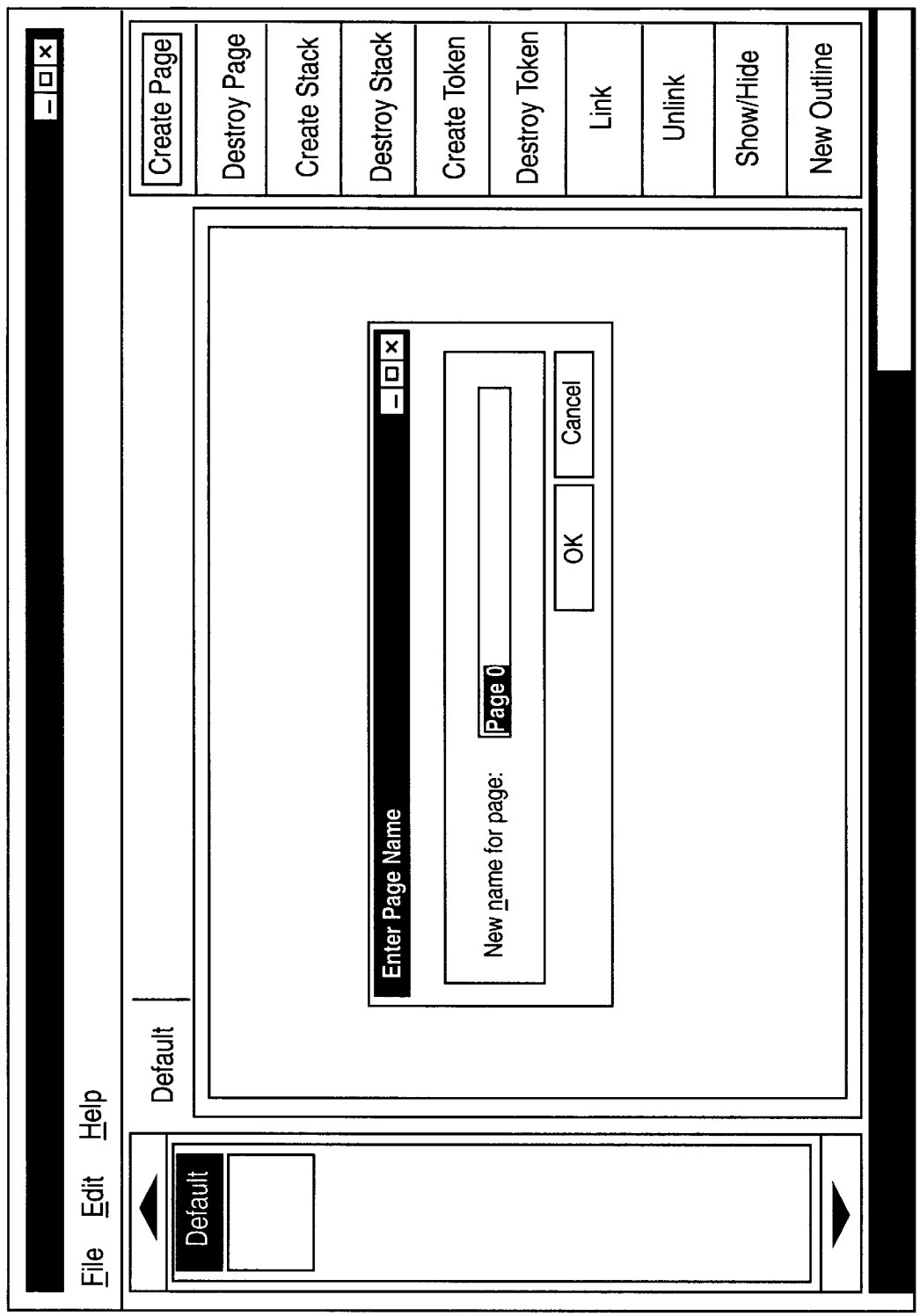
FIG. 3B illustrates naming a page in a tabbed notebook according to one embodiment of the present invention.
Figure 3C:
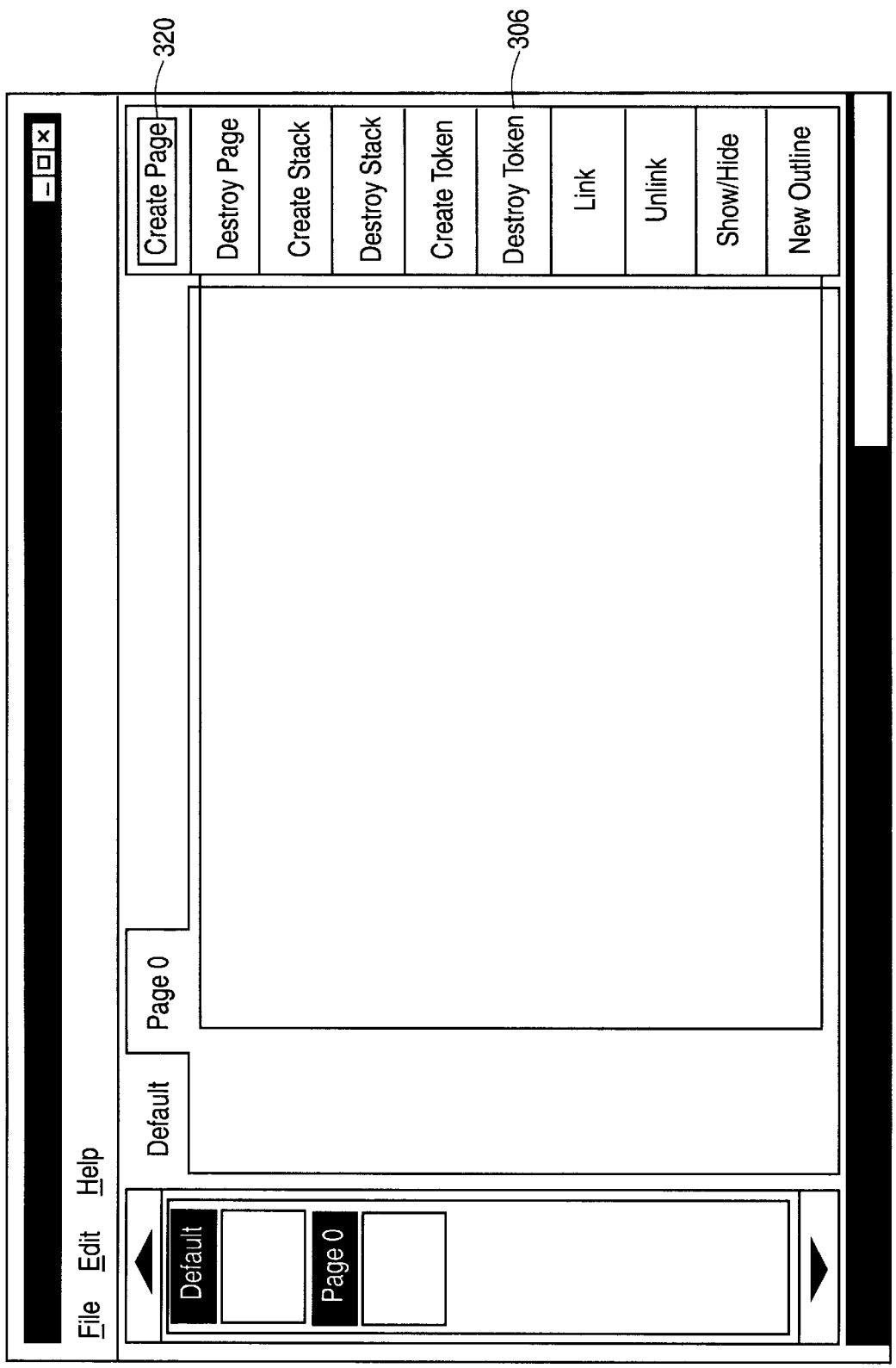
FIG. 3C illustrates creating a page in a tabbed notebook according to one embodiment of the present invention.
Figure 3D:
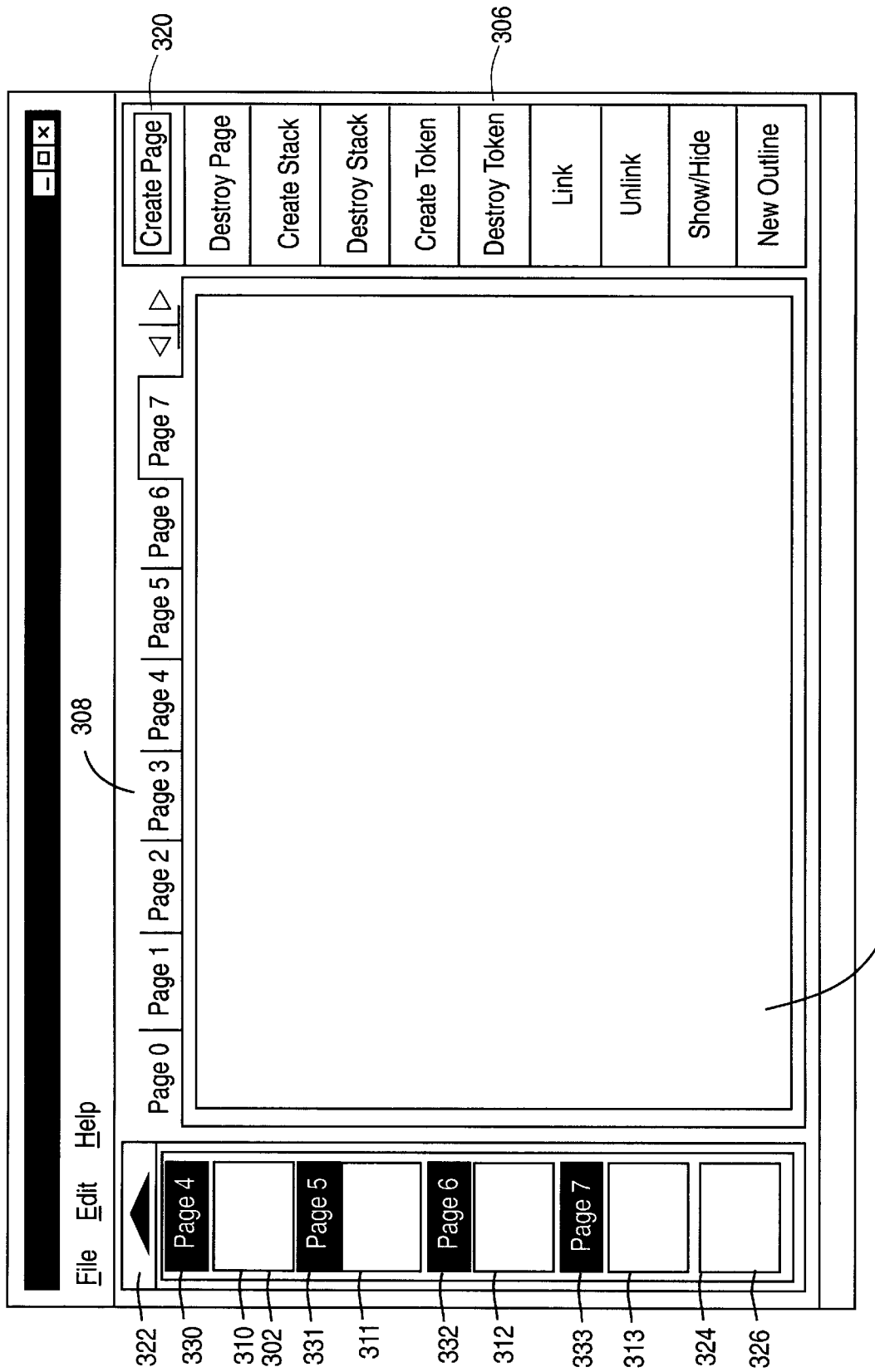
FIG. 3D illustrates a tabbed notebook containing a plurality of pages according to one embodiment of the present invention.

The present invention provides an improved system for graphically manipulating and sorting objects in a tabbed notebook. The present invention can be applied to a wide range of computer software applications, including for example, database applications and spreadsheet applications. The following provides a brief overview of some of the features of the present invention. A more detailed description is provided in conjunction with the flow diagrams. FIG. 3D illustrates one embodiment of a tabbed notebook according to the present invention. The present invention provides a set of icons that correspond to the pages in a tabbed notebook. These icons are called Zframes. One Zframe embodiment is illustrated in FIG. 3D. Each Zframe is comprised of a client area and a label. Examples of Zframe client areas are illustrated by elements 310–313. Examples of Zframe labels are illustrated by elements 330–333. The Zframes provide greater object manipulation capabilities than are provided by the tabs 308. Client surface 304 contains the information stored in the selected page of the tabbed notebook. Pages to be displayed can be selected by pointing and clicking to one of the tabs in the tab row 308 with a graphical user input device such as a mouse. ZFtray 324 contains Zframes 310–313. There is one Zframe for each page in the tabbed notebook. The Zframes provide the user with greater object manipulation capabilities than provided by the tab row alone. The Zframes can be scrolled within ZFtray 324 using, for example, the up arrow 322 and the down arrow 326. Alternatively the Zframes can also be scrolled using the keyboard, as well as by other techniques used for scrolling screen displays. The Zframes can be scrolled in ZFtray 324 independent of the exposed notebook page. Function tray 306 provides quick access to object manipulation tools.

A user can move objects between pages in the tabbed notebook by dragging an object off client surface 304 and dropping the object into the Zframe corresponding to the destination page.

Zframes can also be used to temporarily display a notebook page. In one embodiment, when a user clicks and holds an input pointer on a Zframe, the corresponding page is displayed. When the input device button is released, the displayed page is restored to the page displayed before the Zframe was selected. This allows a user to check the effect of object copy and move operations without requiring the user to remember the page the user was working on before displaying the destination pages. In another embodiment, the Zframe label area is used to display a page, for example, Zframe label 332 illustrated in FIG. 3D. In a further embodiment, the Zframe client area is used to display a page, for example, Zframe client area 312 illustrated in FIG. 3D.

Figure 4:
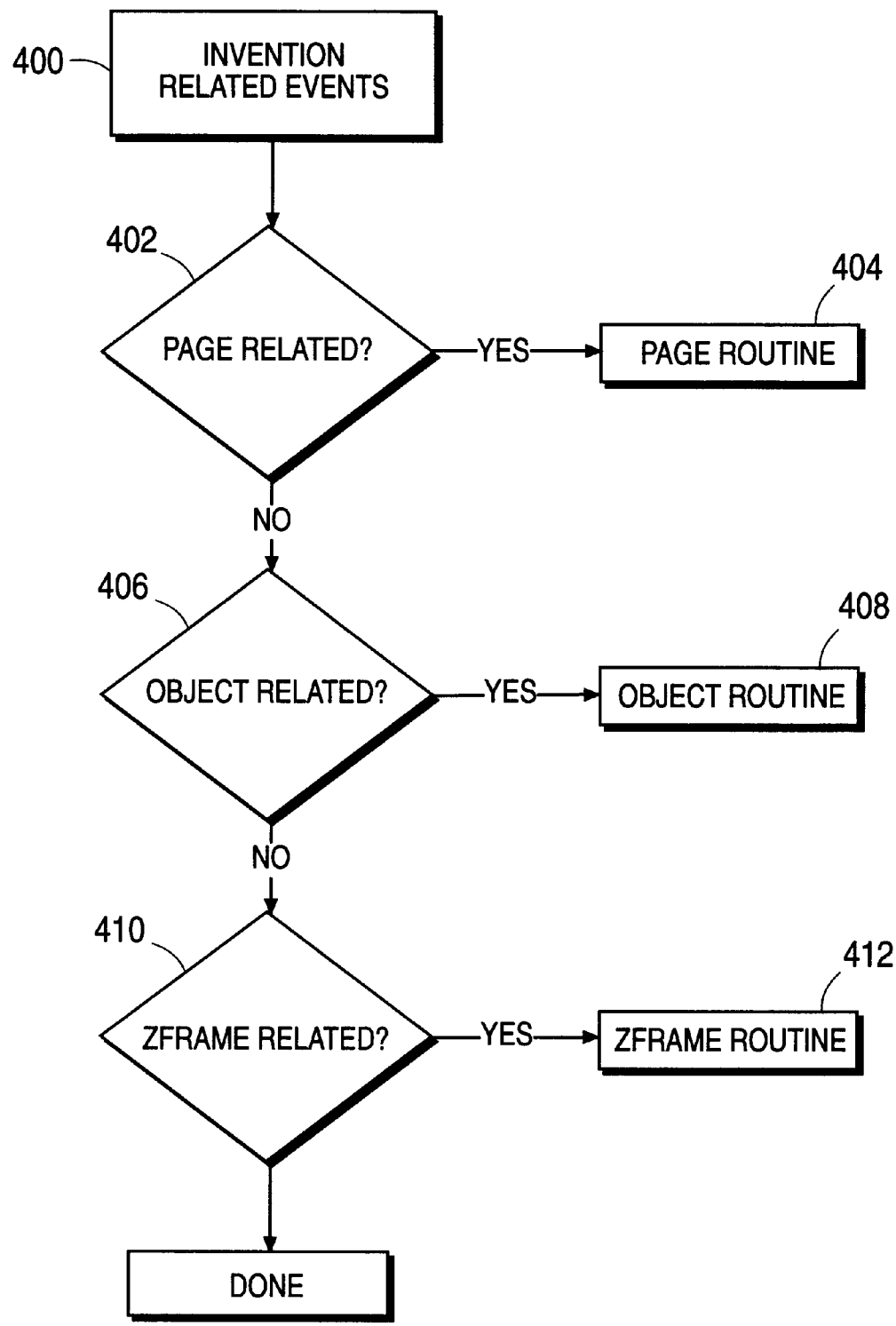
FIG. 4 is a flow diagram illustrating an overview of the functional blocks of one embodiment of the present invention.

FIG. 4 is a flow diagram illustrating an overview of the functional blocks of one embodiment the present invention. Flow diagrams for each of the routines referenced in FIG. 4 are described below. The method begins at step 400 with an input event. For example, a user may perform a point and click operation with the mouse. Step 402 is a decision block. At step 402, the system determines whether the event is page related. If the event is page related then the method continues at step 404 to execute the page related task. If the event is not page related, then the method continues at step 406.

At step 406, the system determines whether the event is object related. If the event is objected related, then the method continues at step 408 to execute the object related task. If the event is not object related, then the method continues at step 410.

At step 410, the system determines whether the event is Zframe related. If the event is Zframe related, then the method continues at step 412 to execute the Zframe related task. If the event is not Zframe related, then the event is addressed by a part of the user interface not illustrated in FIG. 4.

Page Related Events

Figure 5A:
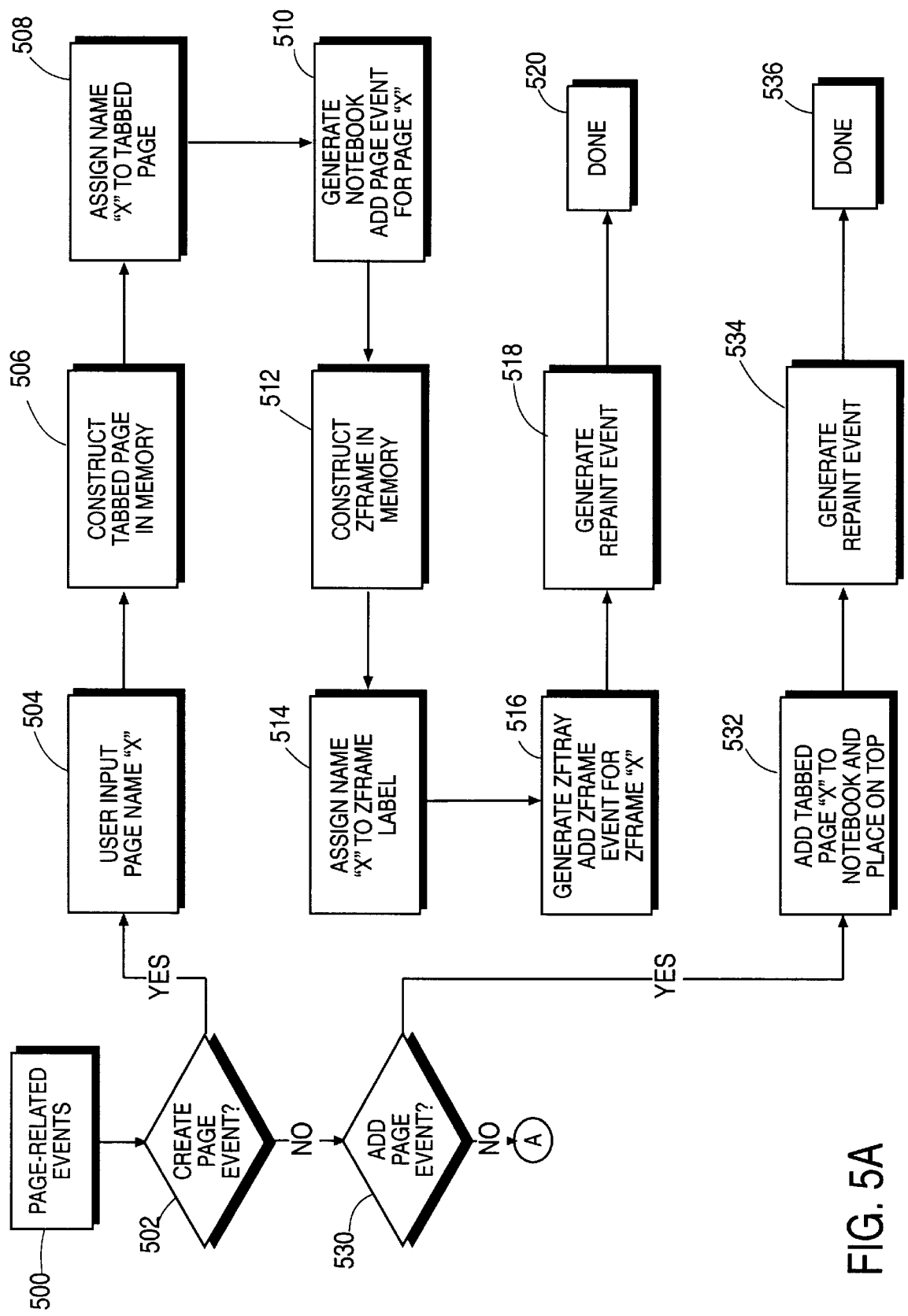
FIGS. 5A and 5B are flow diagrams illustrating page related methods of one embodiment of the present invention.
Figure 5B:
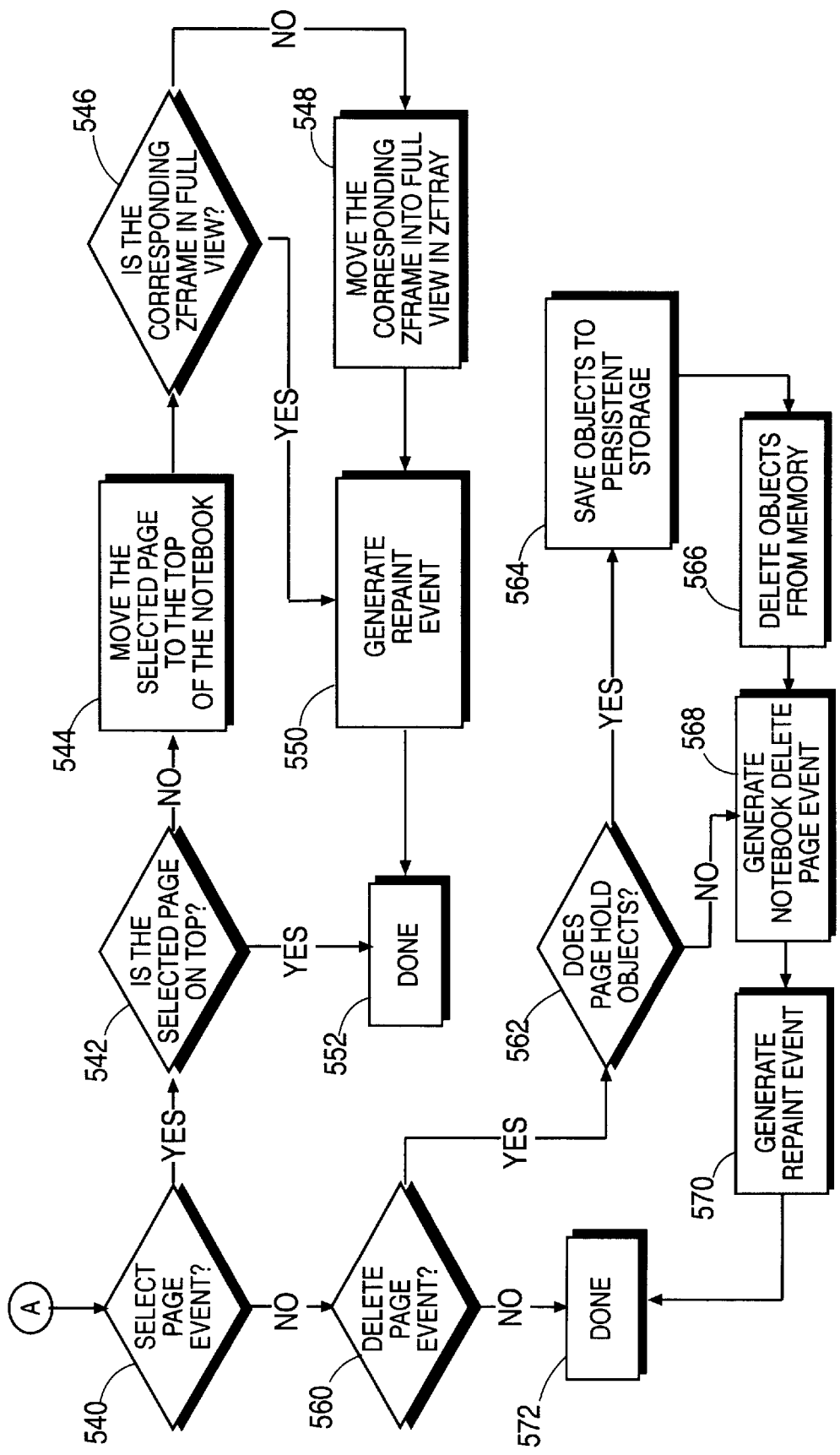

FIGS. 5A and 5B are flow diagrams illustrating page related methods of one embodiment of the present invention. FIG. 5 illustrates examples of page routines referenced as a group in step 404 of FIG. 4. In the method of FIG. 4, when an invention related event is page related, after step 402 the method continues at step 500 at the start of the FIG. 5 flow diagram.

At step 502 the system determines whether the page related event is a create page event. For example, FIG. 3A illustrates a tabbed notebook according to one embodiment of the present invention with a single page named "Default." FIG. 3B illustrates naming a page being added to a tabbed notebook by action of a user. FIG. 3C illustrates creating a new page named "Page 0" in a tabbed notebook. A user can create a page by pointing and clicking with a user input device on Create Page icon 320 in function tray 306 as illustrated in FIG. 3C. If the event is a create page event, then the method continues at step 504 to prompt the user to input a name for the new page. In the example illustrated in FIGS. 5A and 5B, the user inputs the page name "X." After the user inputs the page name, it is displayed in the corresponding tab in tab row 308. For example, in FIG. 3D, the page names "Page 0" through "Page 7" are displayed in tab row 308. Other methods, such as menu choices, can give rise to the creation of a new page in the notebook. Next at step 506 the system constructs the tabbed page in memory. For example, the system may allocate a predetermined amount of memory in the system main memory RAM. At step 508, the system assigns the name provided by the user to the new tabbed page. At step 510 the system generates a notebook add page event for page X. An add page X routine is later executed as described below. At step 512, the system constructs a new Zframe to correspond to the newly created page X. At step 514, the system assigns name X to the Zframe label. For example, in FIG. 3D the Zframe labels "Page 4" through "Page 7" are displayed. At step 516, the system generates ZFtray and adds ZFrame event for ZFrame "X". At step 518, the system generates a repaint event. Finally at step 520 the system exits the page related event routine.

After step 502, if the page related event is not a create page event, then the method continues at step 530. At step 530 the system determines whether the page related event is an add page event. If the event is an add page event, then the method continues at step 532 to add the tabbed page X to the notebook and place page X on the top of the notebook. At step 534, the system generates a repaint event to display page X. At step 536 the system exits the page related event routine.

After step 530, if the page related event is not an add page event, then the method continues at step 540. At step 540, the system determines whether the page related event is a select page event. If the event is a select page event, then the method continues at step 542 to determine whether the selected page is on top of the notebook. The page on top of the notebook is also called the exposed page because it is the page displayed on the screen. Similarly, pages that are not on top of the notebook are generally not displayed and are therefore called hidden pages.

If the selected page is not the exposed page, then at step 544 the selected page is moved to the top of the notebook. At step 546, the system determines whether the Zframe corresponding to the selected page is fully displayed in ZFtray 324. Note that the Zframes can be scrolled in the ZFtray independent of the exposed notebook page. When a user scrolls the Zframes, the user may leave the top and bottom Zframes only partially displayed. If the Zframe is not fully in view then at step 548, the corresponding Zframe is moved into full view in ZFtray 324 of FIG. 3D. If the Zframe is in full view then the method goes directly from step 546 to step 550. At step 550, the system generates a repaint event. At step 552 the system exits the page related event routine.

After step 540, if the page related event is not a select page event, then the method continues at step 560. At step 560 the system determines whether the page related event is a delete page event. If the event is a delete page event, then the method continues at step 562 to determine whether the page contains any objects. If the page does not contain any objects then the method continues at step 568. If the page does contain one or more objects then at step 564 the objects are saved to a persistent storage device. Persistent storage refers generally to a long term memory device, typically non-volatile, for example, a hard disk, a recordable optical disk, or flash type memory. At step 566, the system deletes the objects contained in the page. At step 568, the system generates a repaint event to redraw the screen display. At step 572, the system exits the page related event routine.

Object Related Events

Figure 6A:
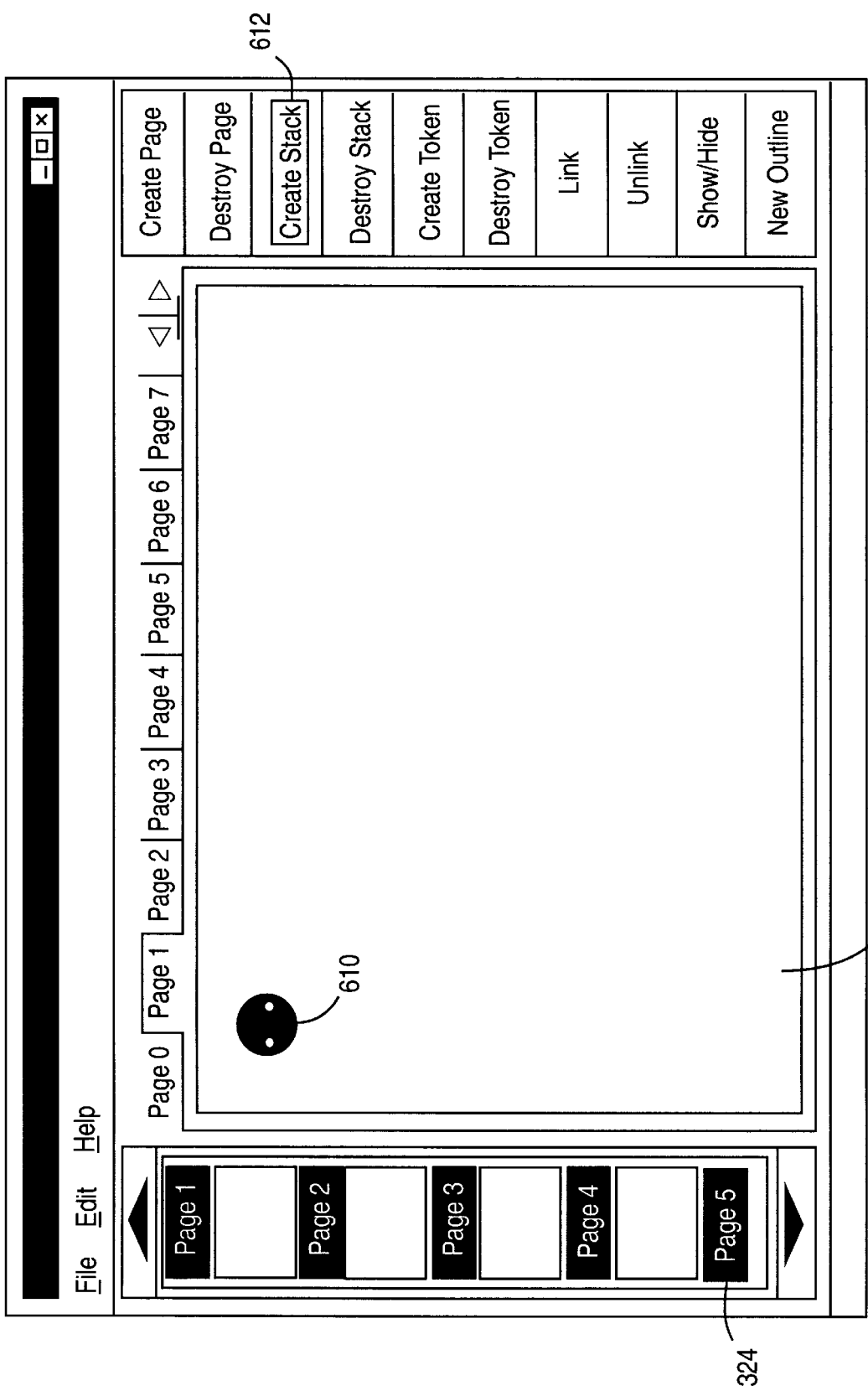
FIG. 6A illustrates one embodiment of a tabbed notebook displaying a page containing an object.

FIG. 6A illustrates one embodiment of a tabbed notebook displaying a page containing a stack element 610, as part of, for example, an object-oriented database management system. A user can create a stack element by clicking on the Create Stack icon 612 with an input device. Object oriented databases integrate object orientation with database capabilities. Object-oriented database technology has been applied to numerous areas of technology including computer-aided design (CAD), computer-aided manufacturing (CAM), computer-aided software engineering (CASE), and intelligent office automation. For example, in the design of an automobile transmission an object-oriented database can be created containing each of the parts of the transmission. Individual parts can be stored on separate pages of a tabbed notebook. Also, links can be defined between the parts to identify relationships between the parts. The database can then be readily searched to identify parts that have particular features. The relationships between parts can also be quickly obtained to identify the potential impact of changes in any one part on the whole system.

Figure 6B:
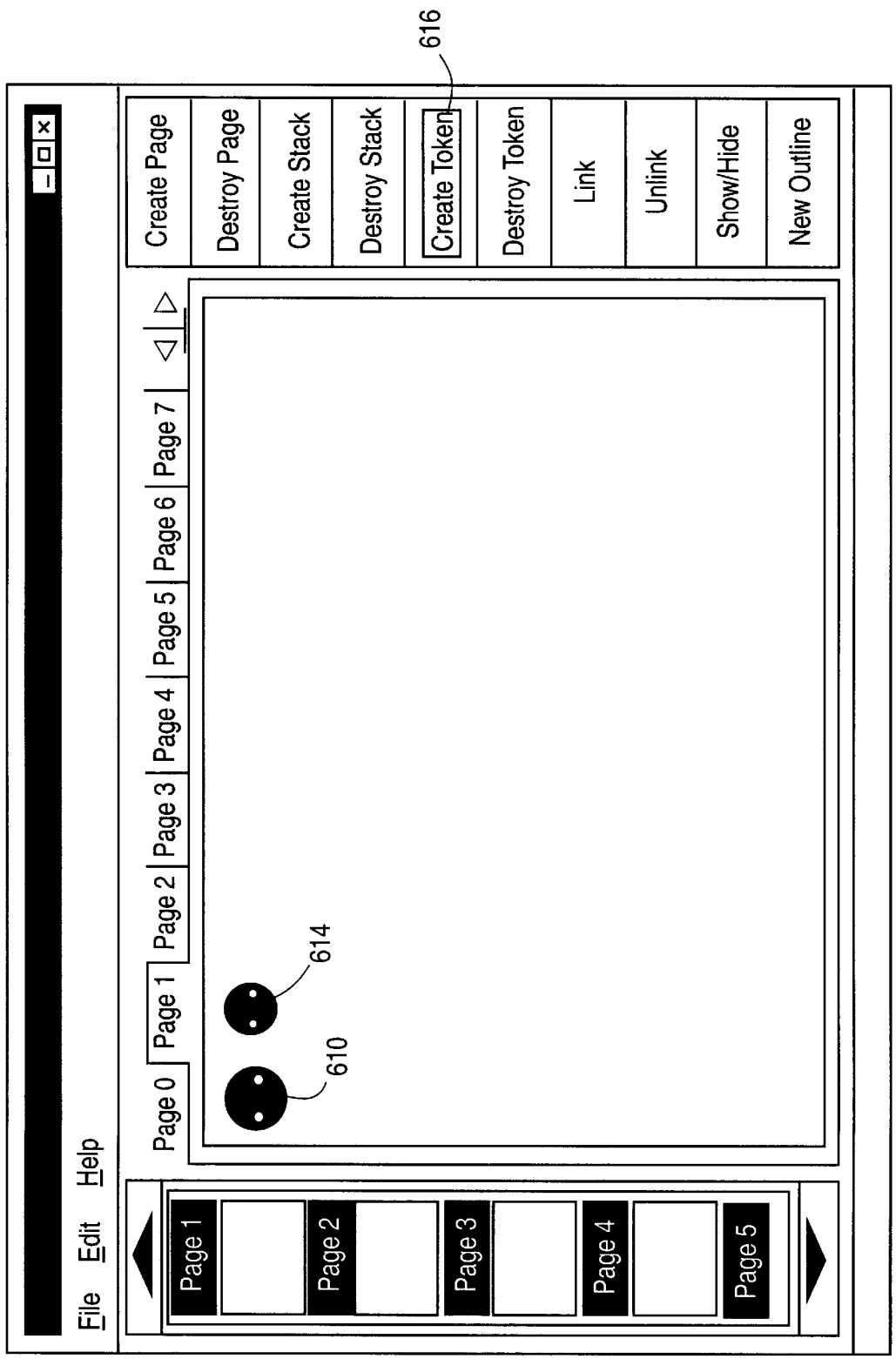
FIG. 6B illustrates creating a token in a tabbed notebook according to one embodiment of the present invention.
Figure 6C:
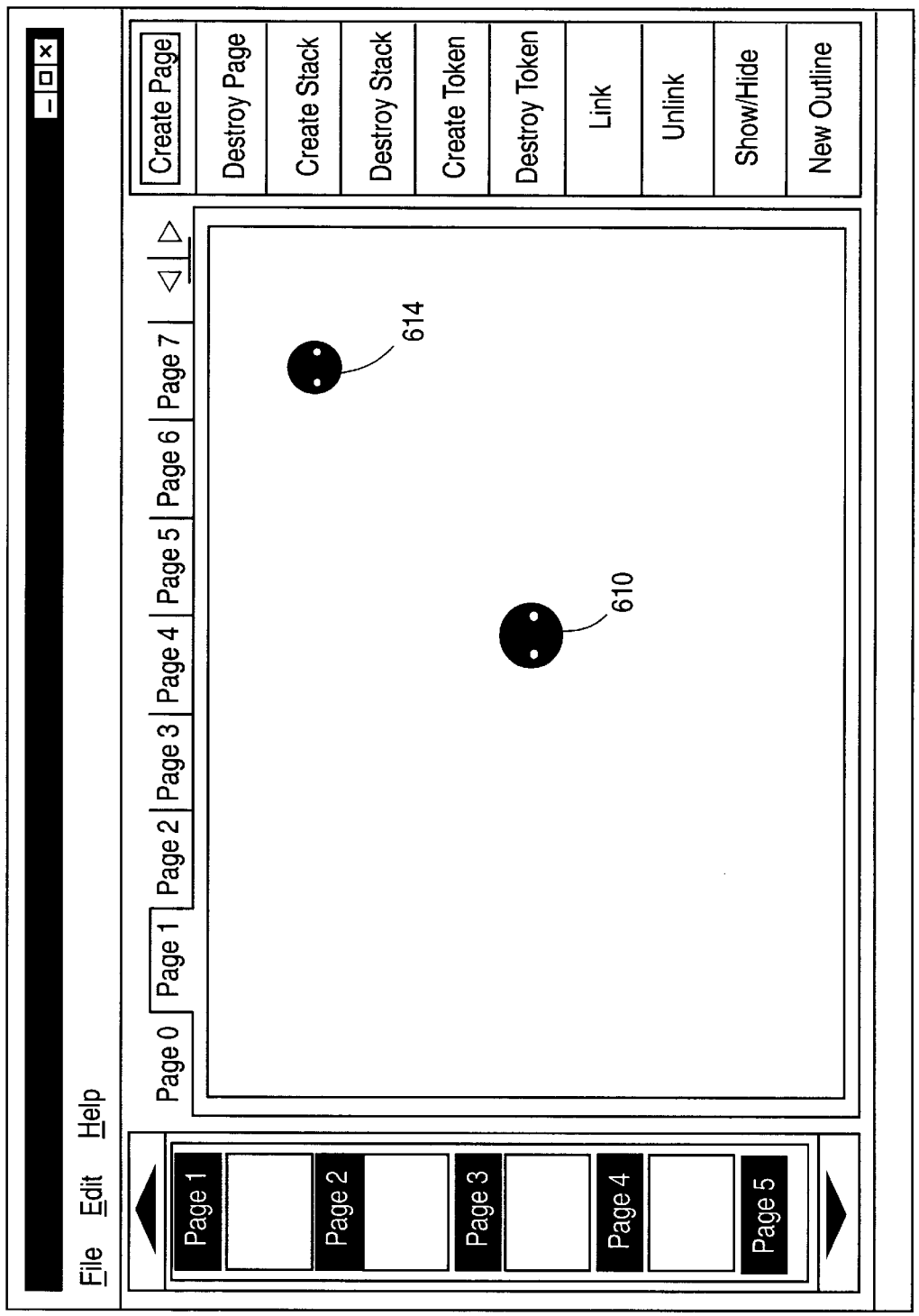
FIG. 6C illustrates moving stack and token elements independently in a tabbed notebook according to one embodiment of the present invention.

FIG. 6B illustrates creating a token in a tabbed notebook according to one embodiment of the present invention. In an object oriented context stack element 610 may represent a class, where a class is a template for creating an instance of the class. For example in the object oriented programming context a class includes a name for the kind of instance, a list of attributes, and a list of messages with corresponding methods to which an instance of the class can respond. Element 614 is a token, which in the object oriented context can represent an object which is an instance of class 610. A user can create a token by clicking on the Create Token icon 616 with an input device. FIG. 6C illustrates that stack and token elements can be moved independently in the tabbed notebook.

Figure 7:
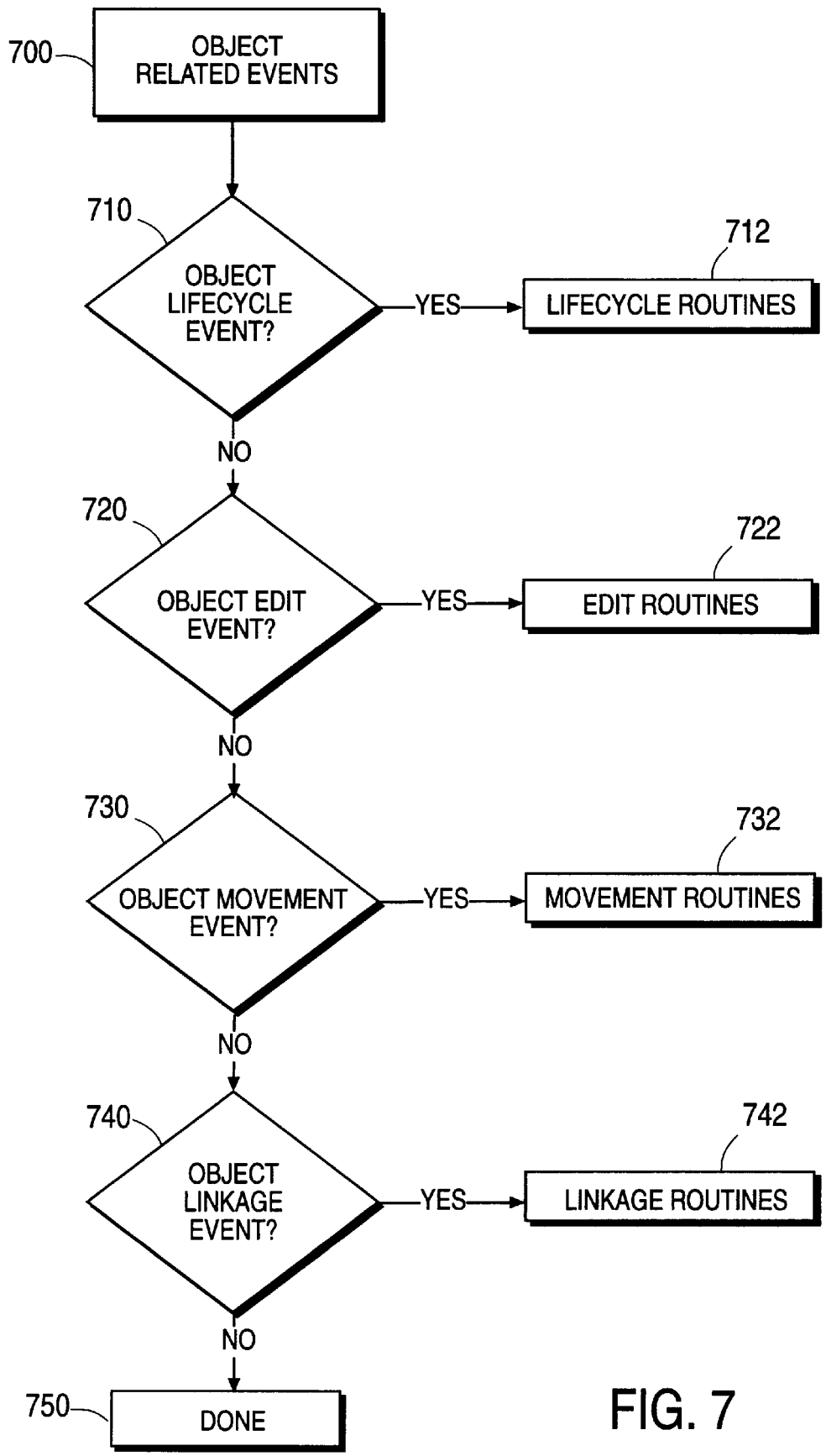
FIG. 7 is a flow diagram illustrating an overview of the object related events of one embodiment of the present invention.

FIG. 7 is a flow diagram illustrating an overview of the object related events of one embodiment of the present invention. FIG. 7 illustrates examples of object routines referenced as a group by step 408 in FIG. 4. In the method of FIG. 4, when an invention related event is object related, after step 408 the method continues at step 700 of FIG. 7. Similar to FIG. 4, FIG. 7 is an overview flow diagram that references more detailed routines described in subsequent flow diagrams.

At step 710 the system determines whether the object related event is an object lifecycle event. If the event is an object lifecycle event, then the method continues at step 712 to execute the lifecycle routine. If the event is not an object lifecycle event then the method continues at step 720.

At step 720 the system determines whether the object related event is an object edit event. If the event is an object edit event, then the method continues at step 722 to execute the edit routine. If the event is not an object edit event then the method continues at step 730.

At step 730 the system determines whether the object related event is an object movement event. If the event is an object movement event, then the method continues at step 732 to execute the movement routine. If the event is not an object movement event then the method continues at step 740.

At step 740 the system determines whether the object related event is an object linkage event. If the event is an object linkage event, then the method continues at step 742 to execute the linkage routine. If the event is not an object linkage event then the method exits the object related event process at step 750.

Object Lifecycle Events

Figure 8A:
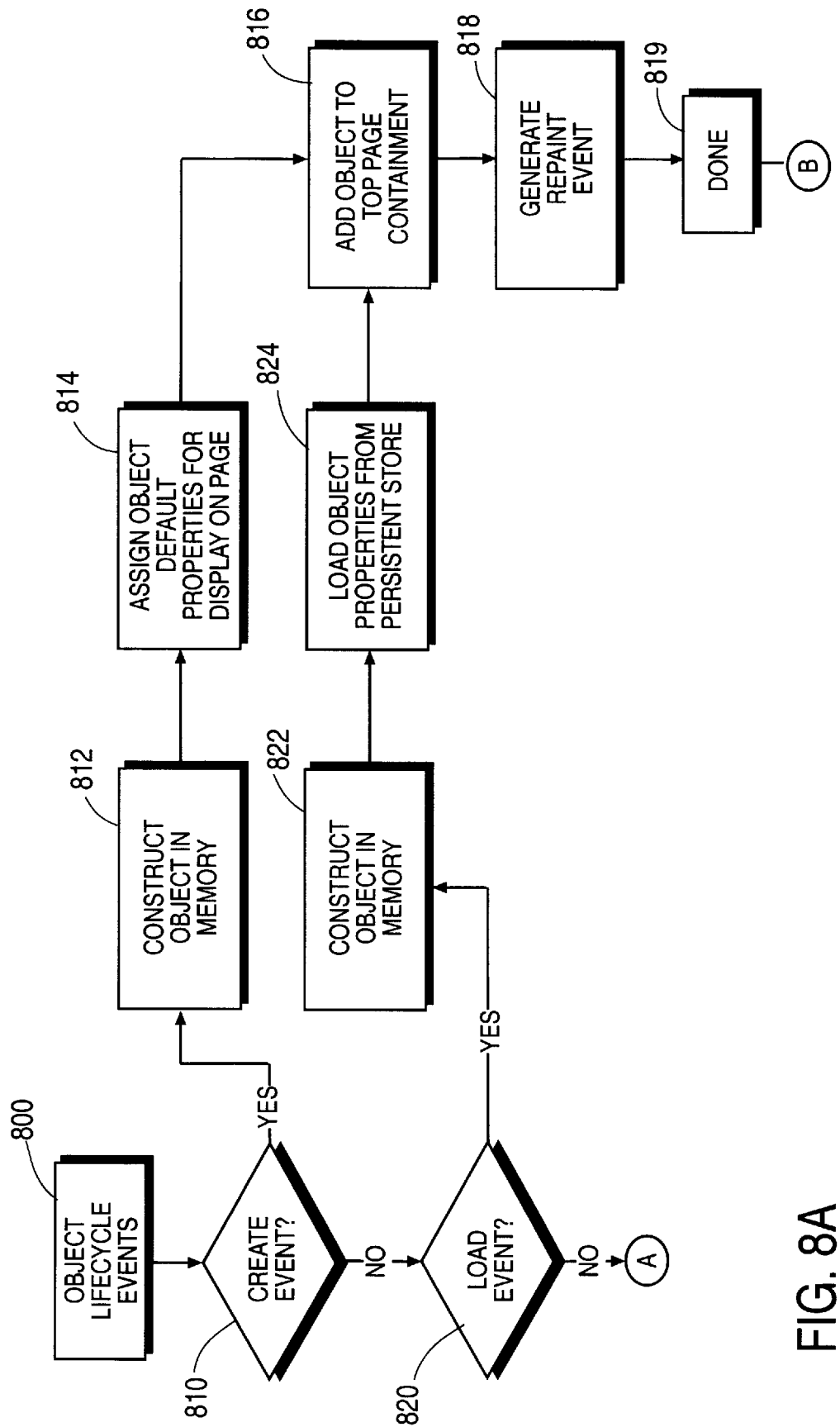
FIGS. 8A and 8B are flow diagrams illustrating object lifecycle event routines of one embodiment of the present invention.
Figure 8B:
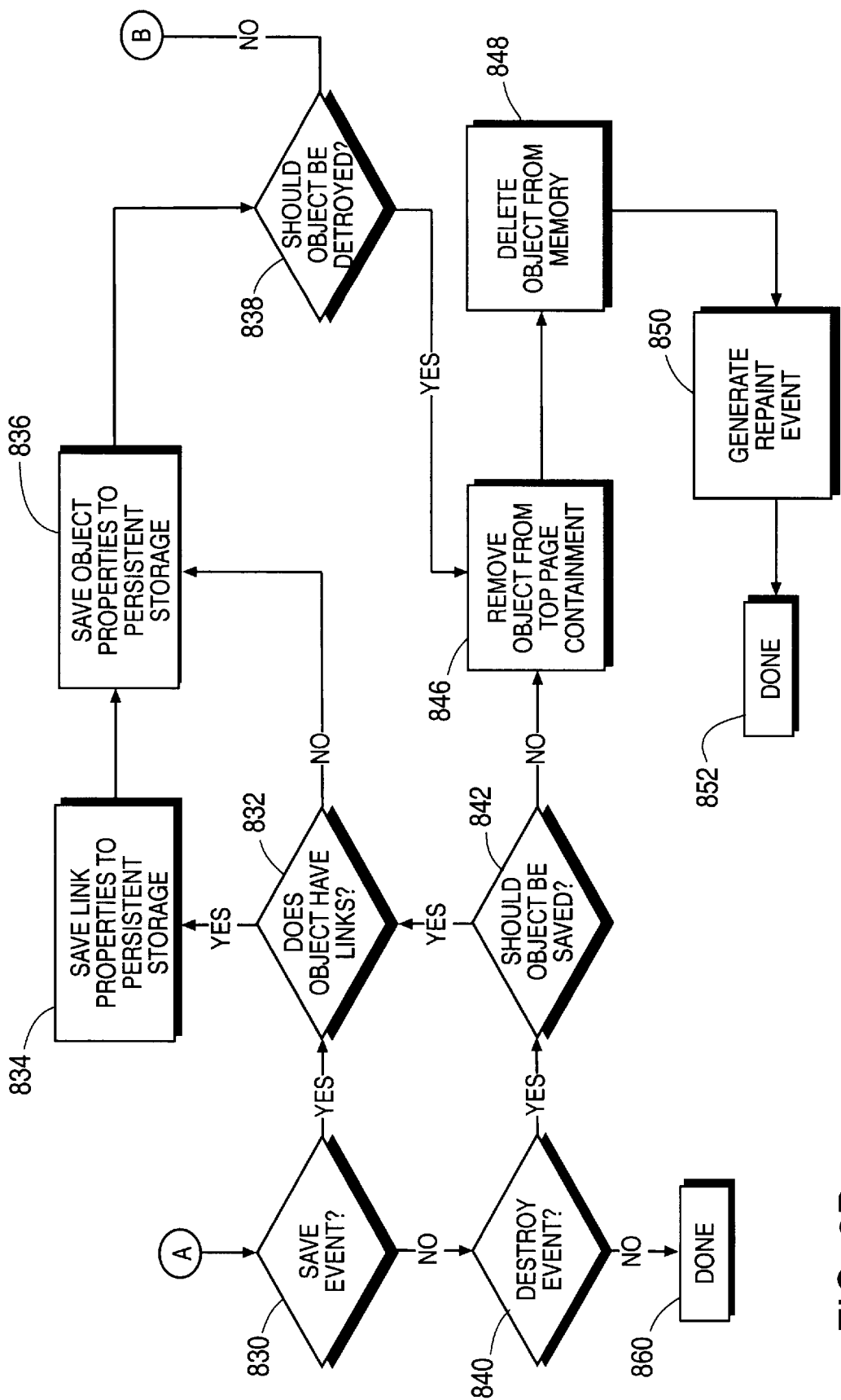

FIGS. 8A and 8B are flow diagrams illustrating object lifecycle event routines of one embodiment of the present invention. In the method of FIG. 7, when an object related event is an object lifecycle event, after step 712 the method continues at step 800 at the start of the FIGS. 8A and 8B flow diagrams.

At step 810 the system determines whether the lifecycle event is a create object event. If the event is a create object event, then the method continues at step 812. At step 812, the system constructs the object in memory. At step 814, the system assigns the object default properties for display on the page. At step 816, the system adds the object to the top page containment. At step 818, the system generates a repaint event, and then exits the object lifecycle events section at step 819.

After step 810, if the event is not a create object event then the method continues at step 820. At step 820 the system determines whether the lifecycle event is a load object event. If the event is a load event, then the method continues at step 822. At step 822, the system constructs the object in memory. At step 824, the system loads the object properties from persistent storage. After step 824 the method continues at step 816 where the system adds the object to the top page containment. The system then generates a repaint event in step 818 and exits the object lifecycle events section at step 819.

After step 820, if the event is not a load event then the method continues at step 830. At step 830 the system determines whether the lifecycle event is a save object event. If the event is a save object event, then the method continues at step 832. At step 832, the system determines whether the object has links, for example, to other objects. If the object has links, then the method continues at step 834. At step 834, the system saves the link properties to persistent storage. The method then continues at step 836. Also, if the object does not have links, then after step 832, the method proceeds to step 836. At step 836, the system saves the object properties to persistent storage. At step 838, the system determines whether the object should be destroyed. If the object should not be destroyed, the system exits the lifecycle events section at step 819. If the object should be destroyed, then the method continues at step 846. At step 846, the system removes the object from top page containment. At step 848, the system deletes the object from memory. At step 850, the system generates a repaint event, and then exits the object lifecycle events section at step 852.

After step 830, if the event is not a save object event then the method continues at step 840. At step 840 the system determines whether the lifecycle event is a destroy object event. If the event is a destroy object event, then the method continues at step 842. At step 842, the system determines whether the object should be saved. If the object should be saved, the method continues at step 832, and proceeds as described above in relation to the save event routine. If the object should not be saved then the method continues at step 846 to remove the object from top page containment. Next at step 848, the system deletes the object from memory. At step 850, the system generates a repaint event, and then exits the object lifecycle events section at step 852.

After step 840, if the event is not a destroy object event then the method exits the object lifecycle events routine at step 860.

Object Edit Events

Figure 9A:
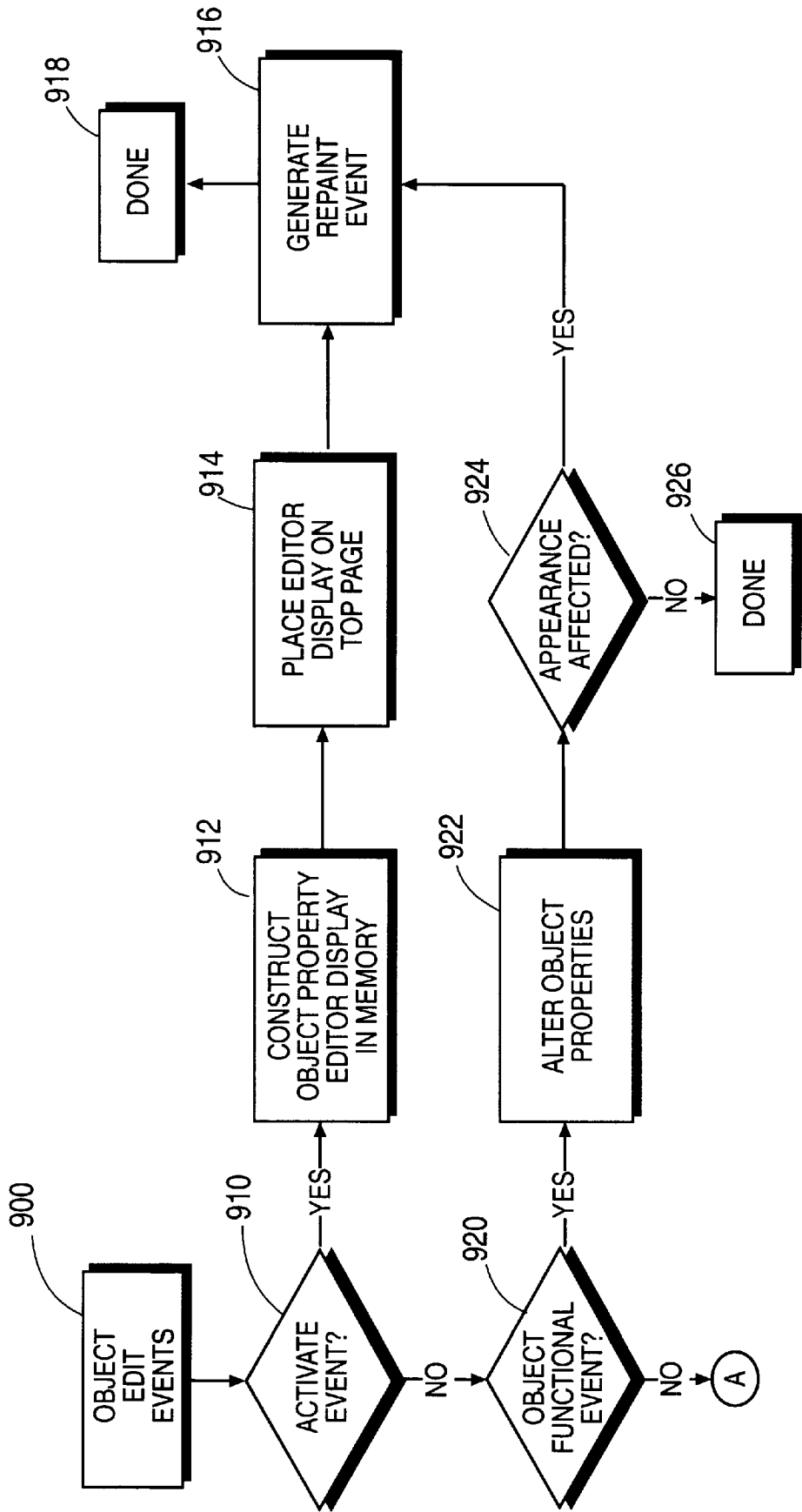
FIGS. 9A and 9B are flow diagrams illustrating object edit event routines of one embodiment of the present invention.
Figure 9B:
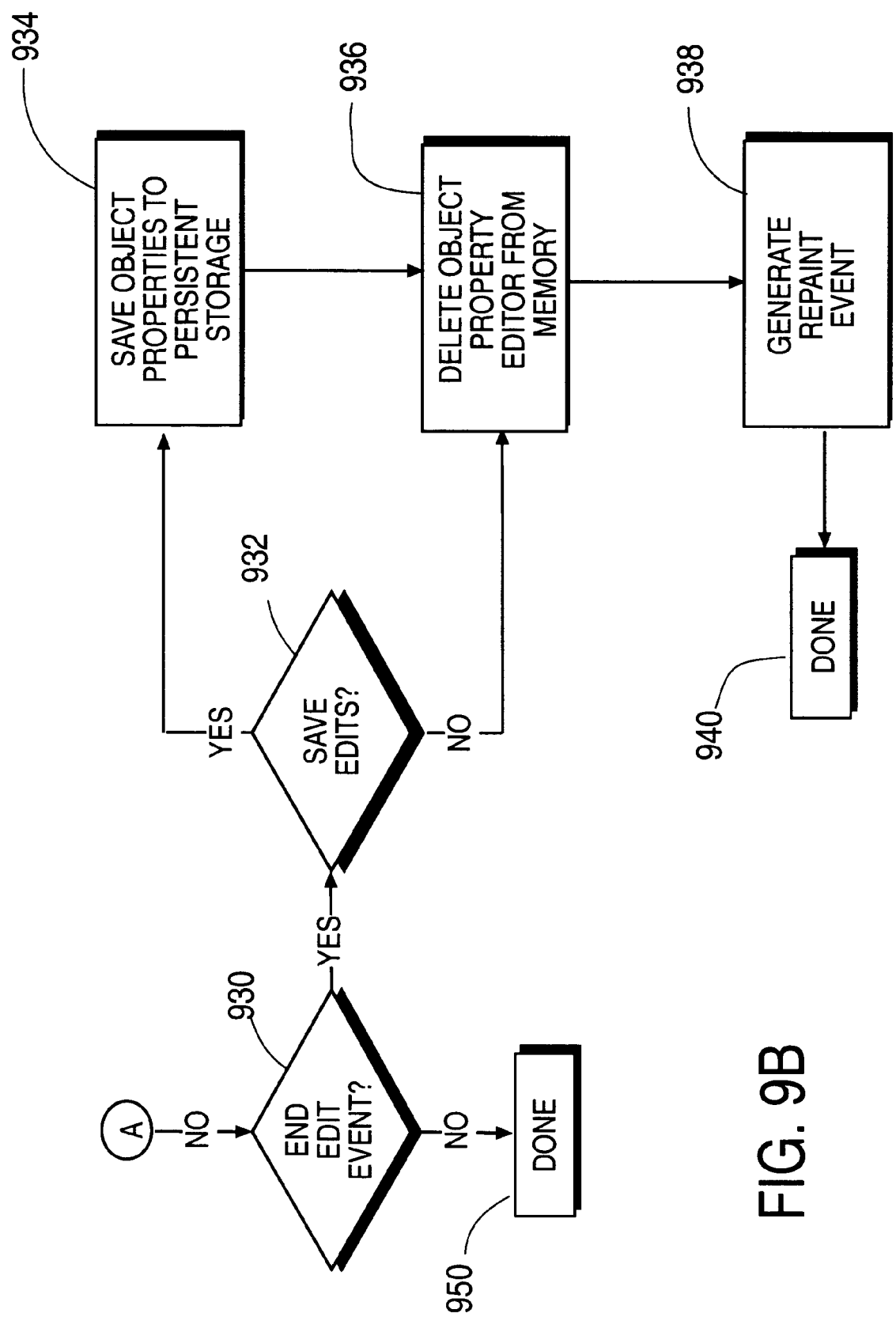

FIGS. 9A and 9B are flow diagrams illustrating object edit event routines of one embodiment of the present invention. In the method of FIG. 7, when an object related event is an object edit event, after step 722 the method continues at step 900 at the start of the FIG. 9 flow diagram.

Figure 9C:
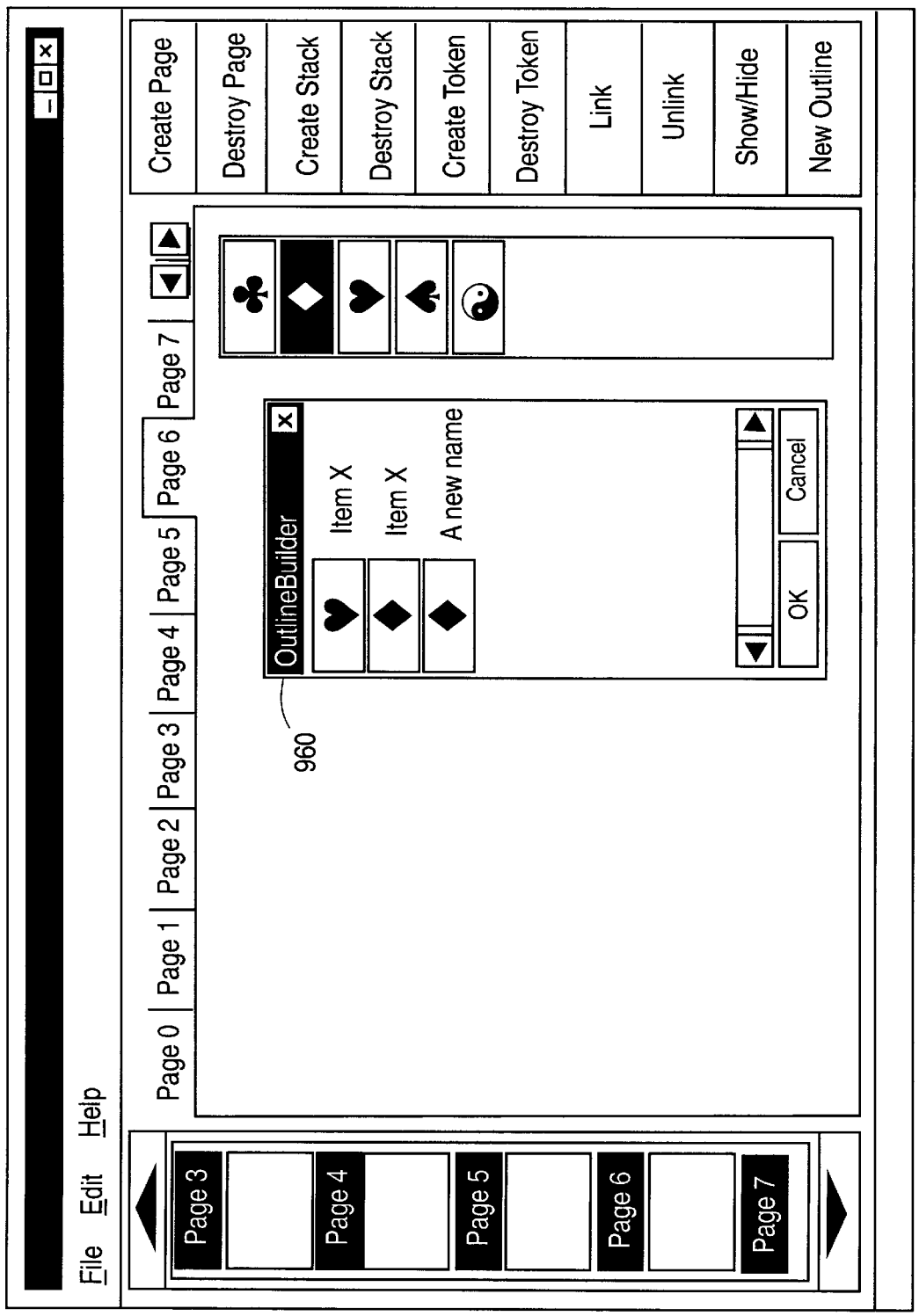
FIG. 9C illustrates a tabbed notebook displaying an object property editor according to one embodiment of the present invention.

At step 910, the system determines whether the edit event is an activate event. If the event is an activate event, then the method continues at step 912. At step 912, the method constructs an object property editor display in memory. At step 914, the system places the editor display on the top page of the tabbed notebook. An example of an object property editor display is illustrated in FIG. 9C by element 960. At step 916, the system generates a repaint event and exits the object edit events section at step 918.

After step 910, if the event is not an activate event then the method continues at step 920. At step 920, the system determines whether the edit event is an object functional event. If the event is an object functional event, then the method continues at step 922. At step 922, the system alters the object's properties according to the functional event. At step 924, the system determines whether the appearance of the object was affected by the alteration of the object's properties. If the object's appearance was affected then the system generates a repaint event at step 916. After step 916, the system exits the object edit events section. After step 924, if the object's appearance was not affected by the alteration of the object's properties then the system exits the object edit events section at step 926.

After step 920, if the event is not an object functional event then the method continues at step 930. At step 930, the system determines whether the edit event is an end edit event. If the event is not an end edit event then the method exits the object edit events section. If the event is an end edit event, then the method continues at step 932. At step 932, the system determines whether the edits should be saved. If there are edits that should be saved then at step 934 the system saves the object properties to persistent storage, the method then continues at step 936. If there are no edits that should be saved then after step 932 the method proceeds directly to step 936. At step 936, the system deletes the object property editor from memory. At step 938, the system generates a repaint event, and exits the object edit events section at step 940.

Object Movement

Figure 10:
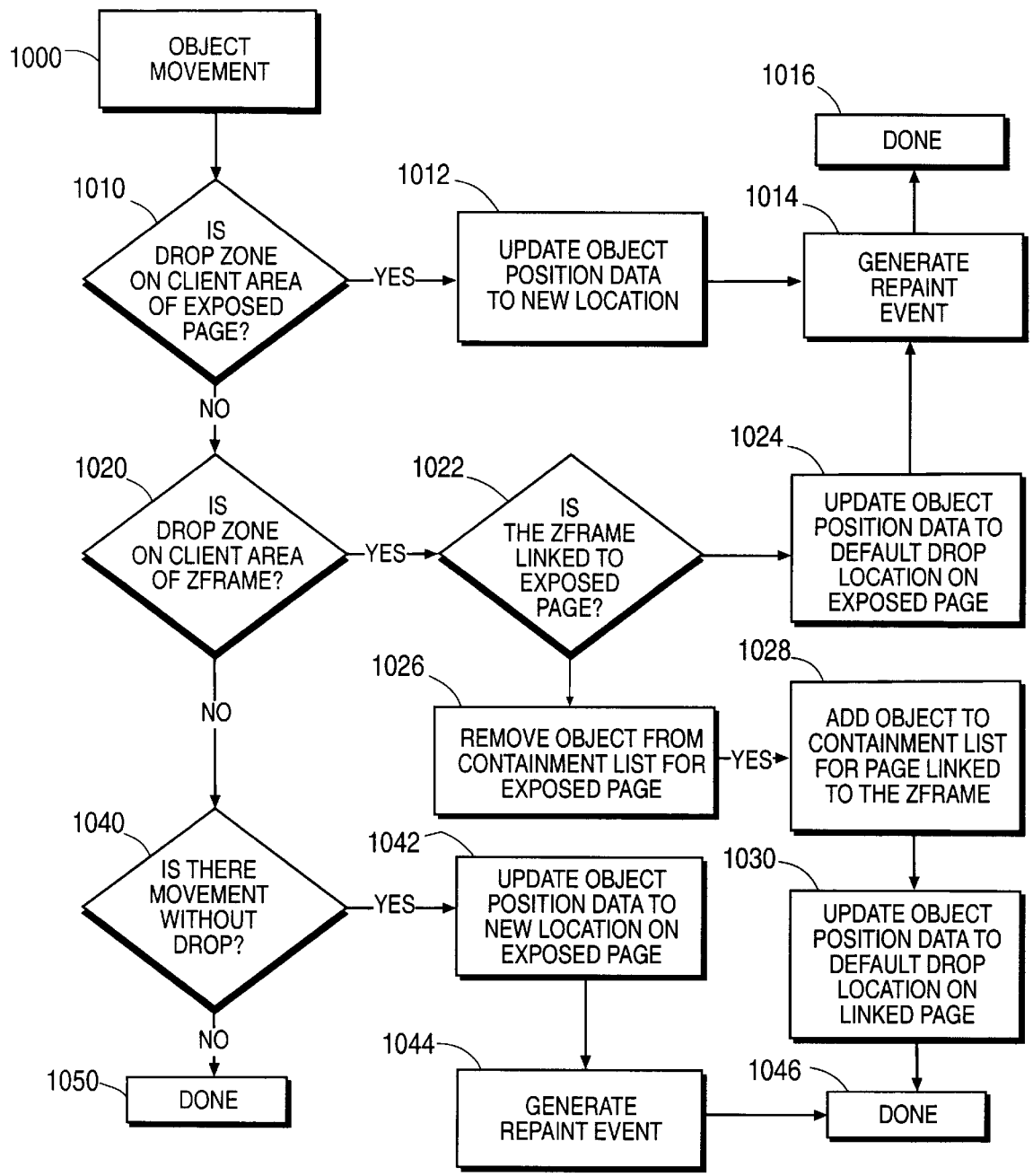
FIG. 10 is a flow diagram illustrating object movement event routines of one embodiment of the present invention.
Figure 14A:
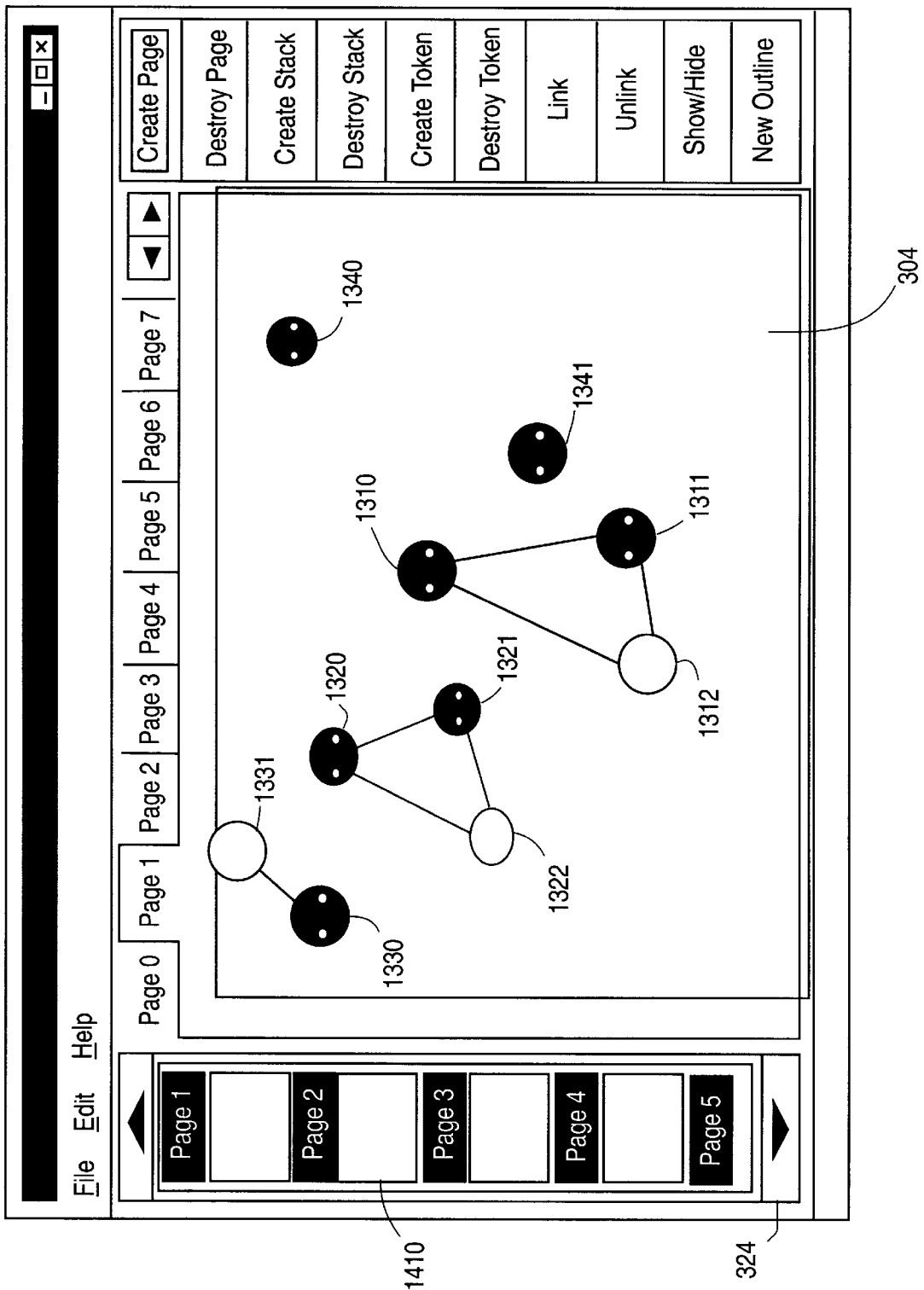
FIG. 14A illustrates a tabbed notebook displaying a plurality of objects according to one embodiment of the present invention.
Figure 14B:
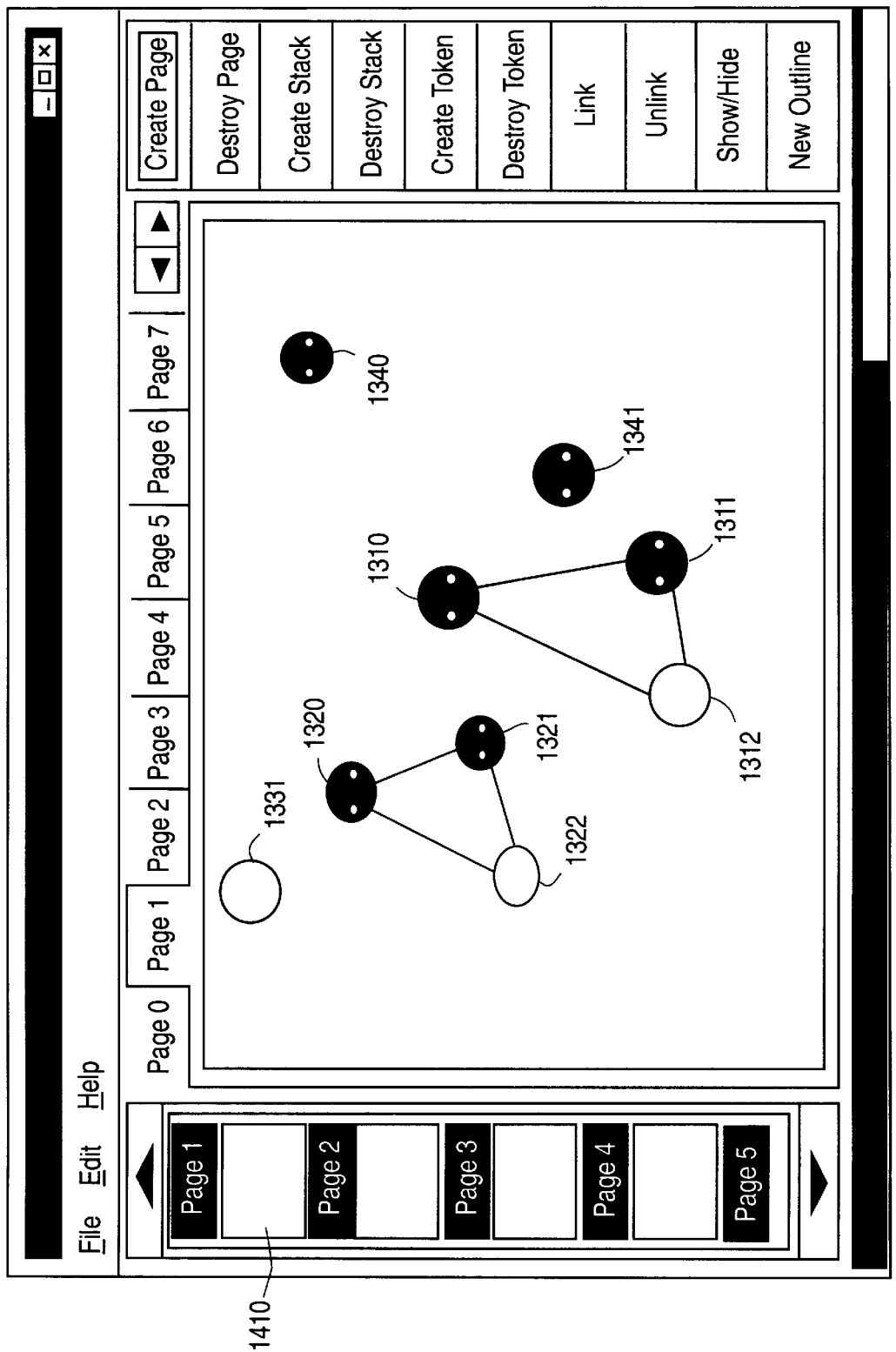
FIG. 14B illustrates a tabbed notebook with one object moved from the displayed page.
Figure 14C:
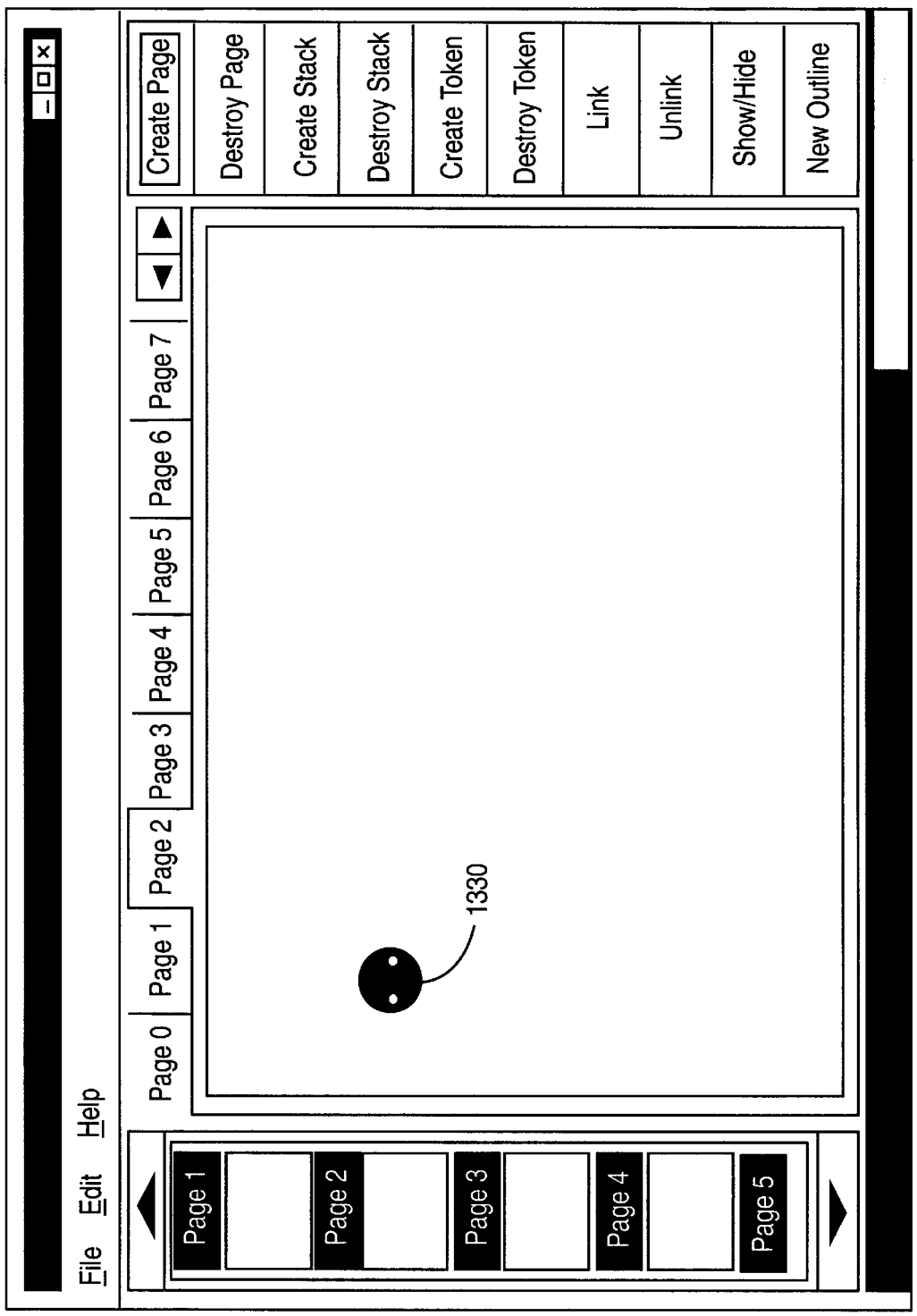
FIG. 14C illustrates displaying the tabbed notebook page to which an object is moved.

FIG. 10 is a flow diagram illustrating object movement event routines of one embodiment of the present invention. Objects can be moved around client surface 304, which is illustrated in FIG. 14A. One way to move an object is to point to the object with an input device and click on it. While the input device button is depressed the object's position tracks the location of the input device pointer. To move an object to another page a user can move the object to the Zframe corresponding to the destination page and release the object on the Zframe. The object will no longer be displayed on the exposed page. For example, in FIG. 14B object 1330 has been moved from client surface 304 to Zframe 1410 corresponding to page 2. Object 1330 is therefore not displayed in FIG. 14B. The visual effect of this move may be enhanced by graphical effects, such as giving the moved object an appearance of falling or sliding into the Zframe when the user releases the object. To view the moved object a user can select the Zframe corresponding to the destination page, which displays the page while the input device selector is activated. For example, FIG. 14C illustrates if a user clicks and holds an input device on Zframe 1410, page 2 is displayed. The display is restored to the previously displayed page when the input device button is released. These functions can also be performed using equivalent keyboard commands, as well as by using other types of input devices.

In the method of FIG. 7, when an object related event is an object movement, the method proceeds from step 730 to step 732 and continues at step 1000 of the FIG. 10 flow diagram.

At step 1010, the system determines whether a selected object has been moved and dropped on the client area of the exposed page in the tabbed notebook. If so then the method continues at step 1012 where the system updates the selected object's position data to reflect the new location that it has been moved to. At step 1014, the system generates a repaint event, and at step 1016 the method exits the object movement routine.

After step 1010, if the selected object was not dropped on the client area of the exposed page then the method continues at step 1020. At step 1020, the system determines whether the drop zone of the user drag and drop event is on the client area of a Zframe. An example of a client area of a Zframe is illustrated by element 310 in FIG. 3D. If the drop zone is on a client area of a Zframe, then the method continues at step 1022. At step 1022 the system determines whether the drop zone Zframe is linked to the exposed page. If the drop zone Zframe is tied to the exposed page then the method continues at step 1024. At step 1024, the system updates the objects position data to correspond to the default drop location on the exposed page. For example, the program may define the lower left corner of the screen display as the default drop location. Thus, when a user drops an object into a Zframe and then selects the corresponding page to be displayed the moved objected is displayed in the lower left corner of the client surface 304. At step 1014, the system then generates a repaint event to update the display to reflect the new position of the object. At step 1016, the method exits the object movement routine.

After step 1022, if the Zframe is not linked to the exposed page, then the method continues at step 1026. At step 1026, the system removes the object from the containment list for the exposed page because the user has graphically moved the object out of the exposed page. At step 1028, the system adds the object to the containment list for the page linked to the drop zone Zframe. At step 1030, the system updates the object position data to correspond to the objects new position in the default drop location on the page linked to the drop zone Zframe. The method then exits the object movement routine at step 1046.

After step 1020, if the drop zone is not on the client area of a Zframe then the method continues at step 1040. At step 1040, the system determines whether a user has moved an object and has not yet dropped the object. If so then at step 1042, the system updates the object position data to reflect the new location on the exposed page. At step 1044, the system generates a repaint event to update the display to indicate the new location of the object. The method then exits the object movement routine at step 1046. After step 1040, if there is not an object that has been moved and is currently selected then the method exits the object movement routine at step 1050.

Object Linkage

Figure 11A:
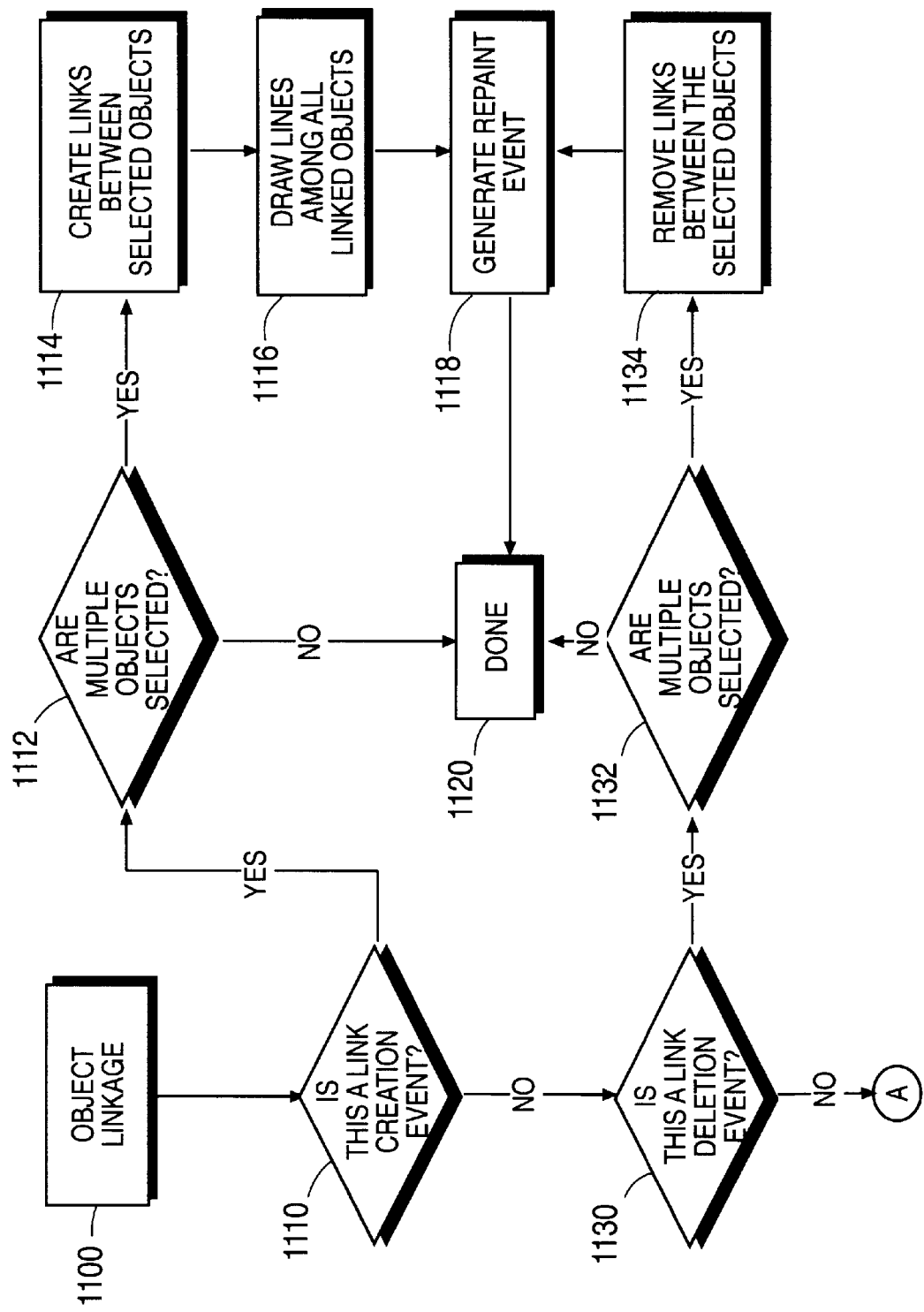
FIGS. 11A and 11B are flow diagrams illustrating object linkage event routines of one embodiment of the present invention.
Figure 11B:
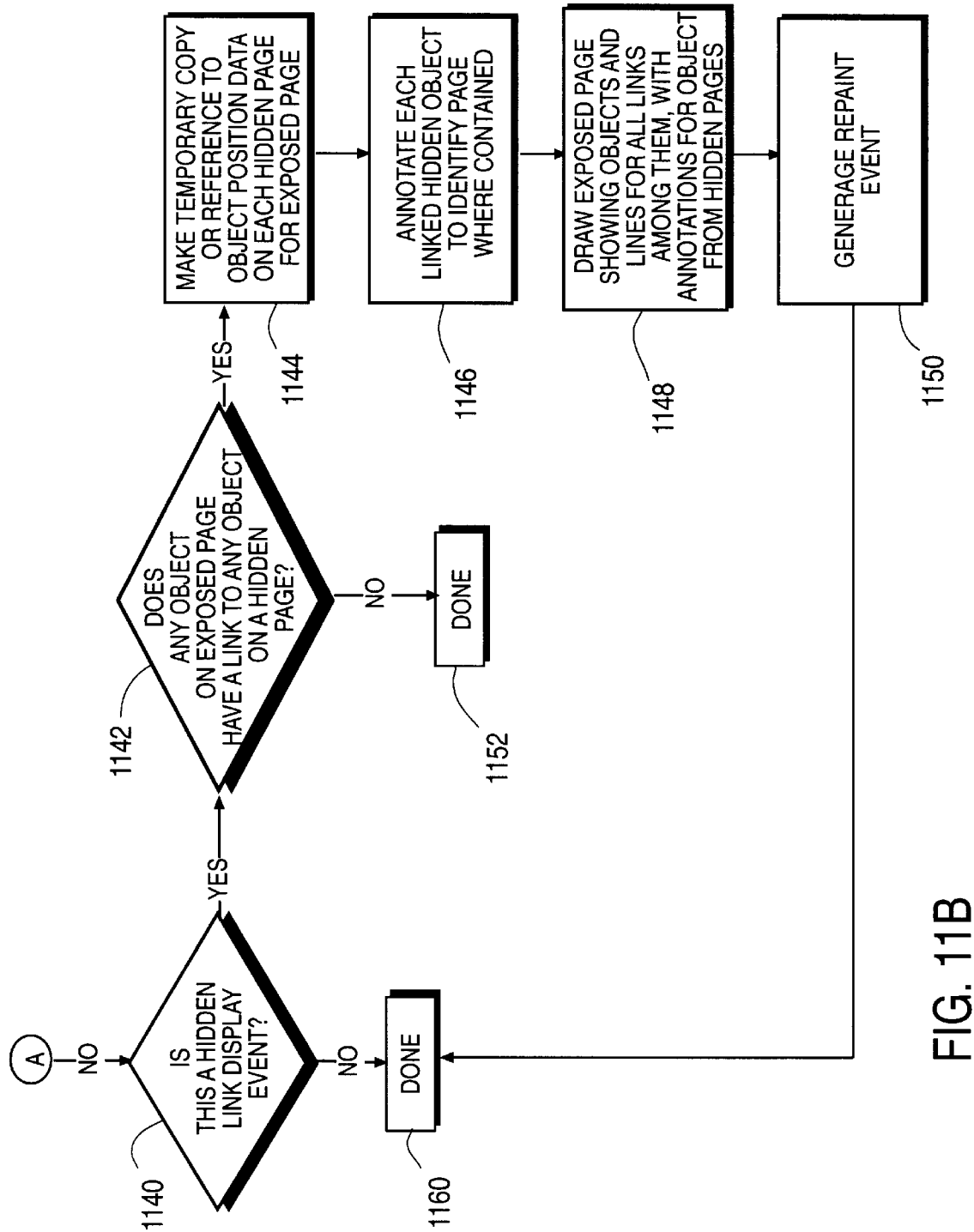
Figure 13A:
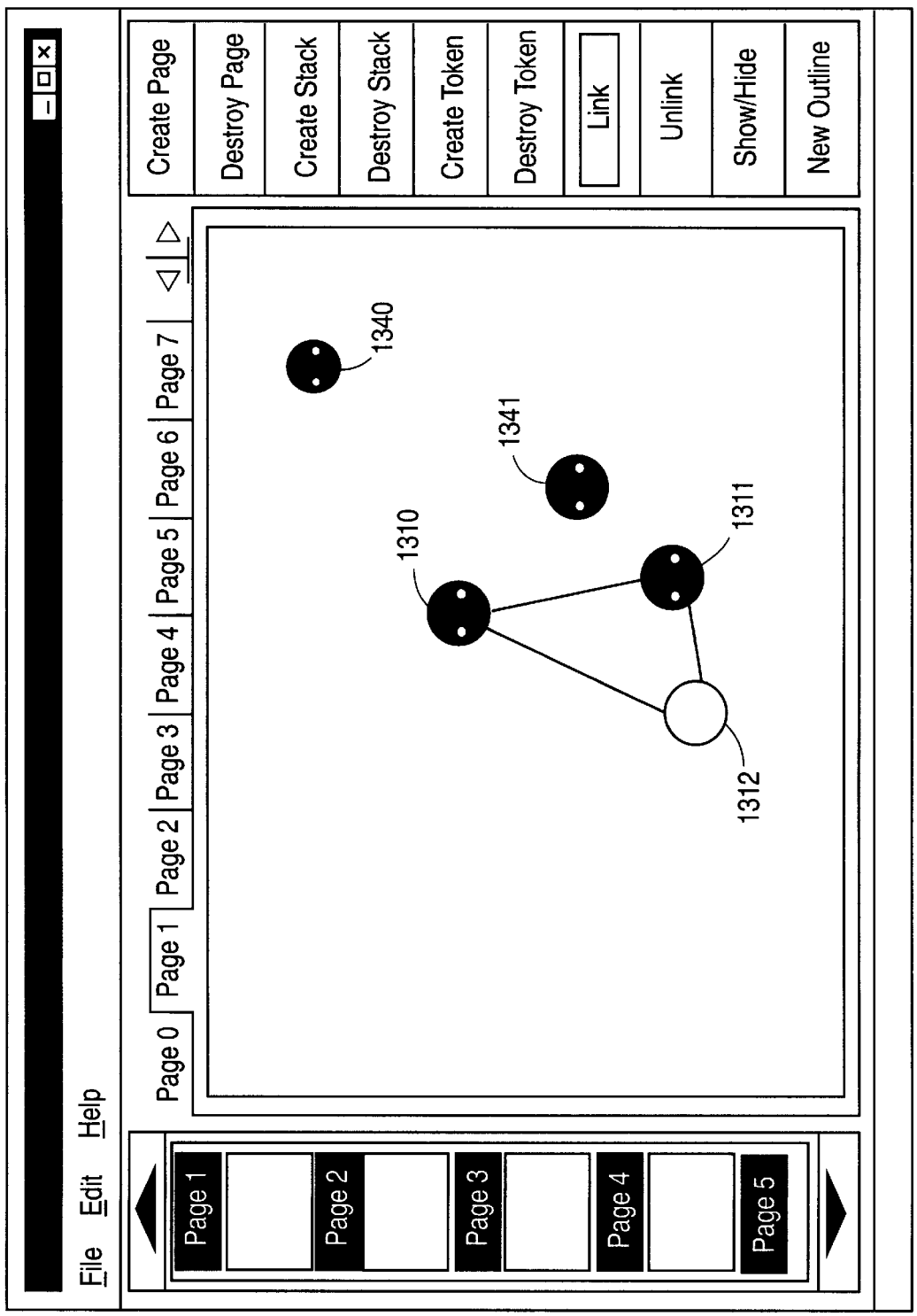
FIG. 13A illustrates a tabbed notebook displaying linked objects according to one embodiment of the present invention.
Figure 13B:
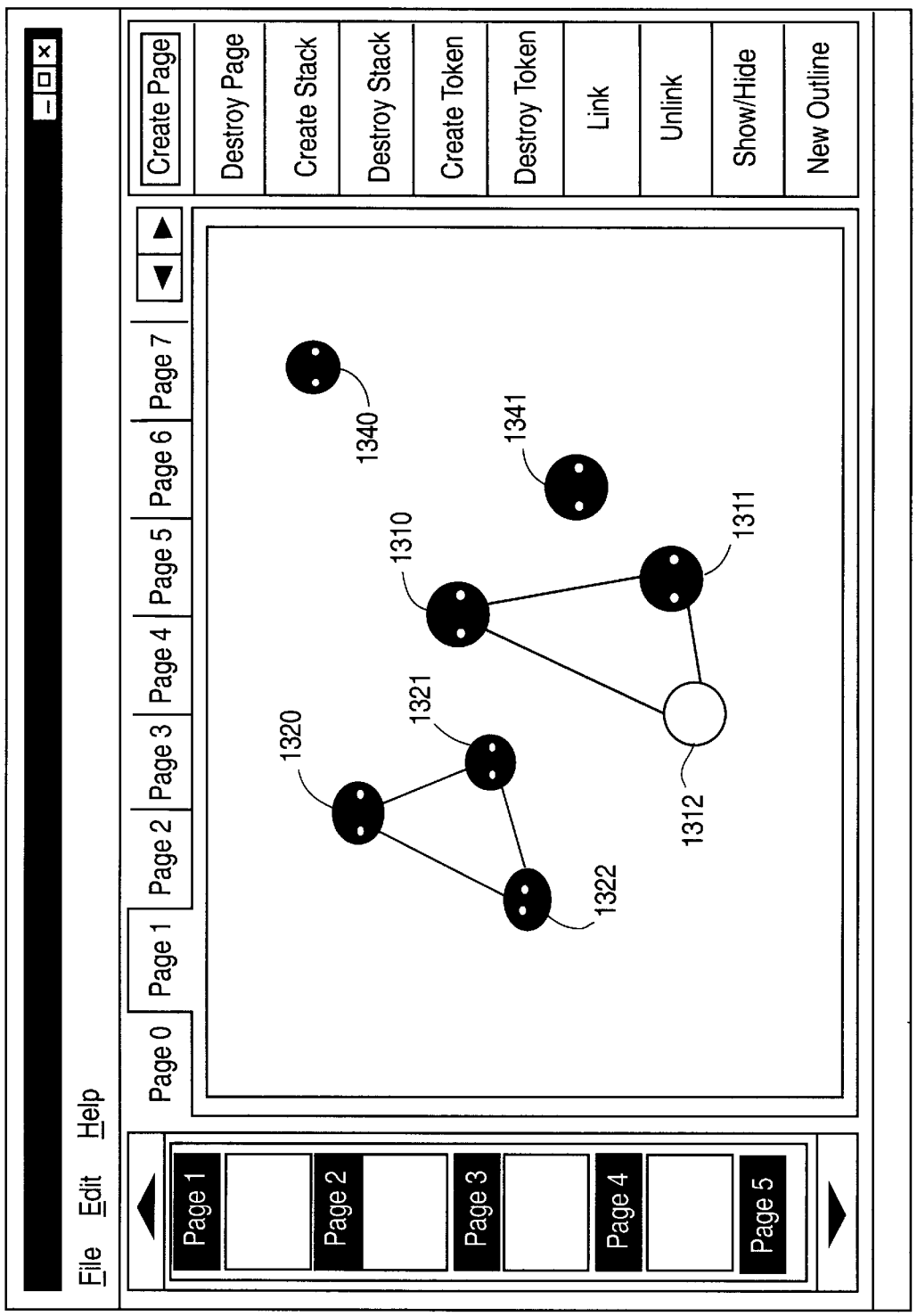
FIG. 13B illustrates a tabbed notebook displaying linked objects and selected objects according to one embodiment of the present invention.

FIGS. 11A and 11B are flow diagrams illustrating object linkage event routines of one embodiment of the present invention. In general terms a link represents a connection between objects. In the object-oriented programming context links between objects allows messages to be sent between the linked objects. Often a link may be defined to provide message transmission in only one direction. An object may use a message to utilize the services of the recipient object. In the computer aided design (CAD) context links may represent relationships between component parts of a system. FIG. 13A illustrates an example of a tabbed notebook displaying linked objects according to one embodiment of the present invention. FIG. 13A illustrates the link between stack elements 1310–1312 using lines connecting the elements. FIG. 13B illustrates links between stack elements 1310–1312 and token elements 1320–1322. In one object oriented programming embodiment where tokens represent object instances, and stack elements represent classes, object instances cannot be linked to classes. FIG. 13B also illustrates the selecting of elements as indicated by the lighter shading of selected objects 1312 and 1321. Selecting an element is a preliminary step to performing a function on an element such as moving or copying.

Links between objects on a displayed page are displayed with lines linking the respective objects. Displayed objects can also be linked to hidden objects. Hidden objects are objects contained in pages that are not currently being displayed. To display an object's links to hidden objects a user can, for example, move the mouse to point to an object and hold down the right mouse button. The previously hidden objects are then displayed on the exposed page while the right mouse button remains depressed. The display of the hidden objects can be distinguished from the objects contained in the exposed page by a variety of techniques including displaying the previously hidden objects at a different intensity, or using shading, patterns, or rings around the hidden objects or the corresponding Zframes. These display techniques may also be combined. While the user is depressing the right mouse button to display hidden objects, the user can change the displayed page by moving the cursor to a previously hidden object and releasing the button. This causes the page that contains the object to which the mouse is pointing to to be displayed. The user controls are described by way of example, other input controls can also be used such as the keyboard arrow keys.

In the method of FIG. 7, when the object related event is an object linkage event, the method proceeds from step 740 to step 742 and then continues at step 1100 at the start of the FIG. 11 flow diagram.

At step 1110, the system determines whether the object linkage event is a link creation event. If the event is a link creation event, then the method continues at step 1112. At step 1112, the system determines whether multiple objects have been selected. If multiple objects have not been selected then a link cannot be created and the method exits the linkage routine at step 1120. If multiple objects have been selected then the method continues at step 1114. At step 1114, the system creates the links between the selected objects as defined by the user. In one embodiment, the system creates links between all of the selected objects. At step 1116, the system draws lines between the selected objects to represent the links. At step 1118, the system generates a repaint event to display the links. Then at step 1120, the method exits the object linkage routine.

After step 1110, if the event is not a link creation event then the method continues at step 1130. At step 1130, the system determines whether the object linkage event is a link deletion event. If the event is a link deletion event, then the method continues at step 1132. At step 1132, the system determines whether multiple objects have been selected. If multiple objects have not been selected then no link has been defined to be deleted, therefore the method exits the object linkage routine at step 1120. If multiple objects have been selected then at step 1134 the system deletes links between the selected objects as defined by the user. In one embodiment, the system deletes one link between each of the selected objects that have at least one link. At step 1118, the system then generates a repaint event to remove the deleted links from the display The method then exits the object linkage routine at step 1120.

After step 1130, if the event is not a link deletion event then the method continues at step 1140. At step 1140, the system determines whether the event is a display hidden link event. If not then the method exits the object linkage routine at step 1160. If the event is a display hidden link event, then at step 1142 the system determines whether any object on the exposed page has a link to an object on a hidden page. If not then the method exits the object linkage routine at step 1152. If an object on the exposed page has a link to an object on a hidden page, then in one embodiment at step 1144 the system makes a temporary copy of the position of each of the hidden objects that are linked to objects on the exposed page. In another embodiment, the system creates references to object position data for each of the hidden objects linked to objects on the exposed page. At step 1146, the system annotates each linked hidden object to identify what page the object is contained in. At step 1148, the system draws the exposed page with originally displayed objects and the hidden objects. In one embodiment, all of the links between the objects are displayed with lines. The objects from hidden pages are displayed with an indication that they are from a hidden page. In one embodiment, objects from hidden pages are displayed at a lower intensity than objects that are contained in the displayed page. At step 1150, the system generates a repaint event. Then the method exits the object linkage routine at step 1160.

ZFrame Related Events

Zframes provide a tabbed notebook user interface greater object manipulation capabilities than is provided by tabs alone. One Zframe embodiment is illustrated in FIG. 3D. Each Zframe is comprised of a client area, for example element 310, and a label, for example element 330.

Figure 12A:
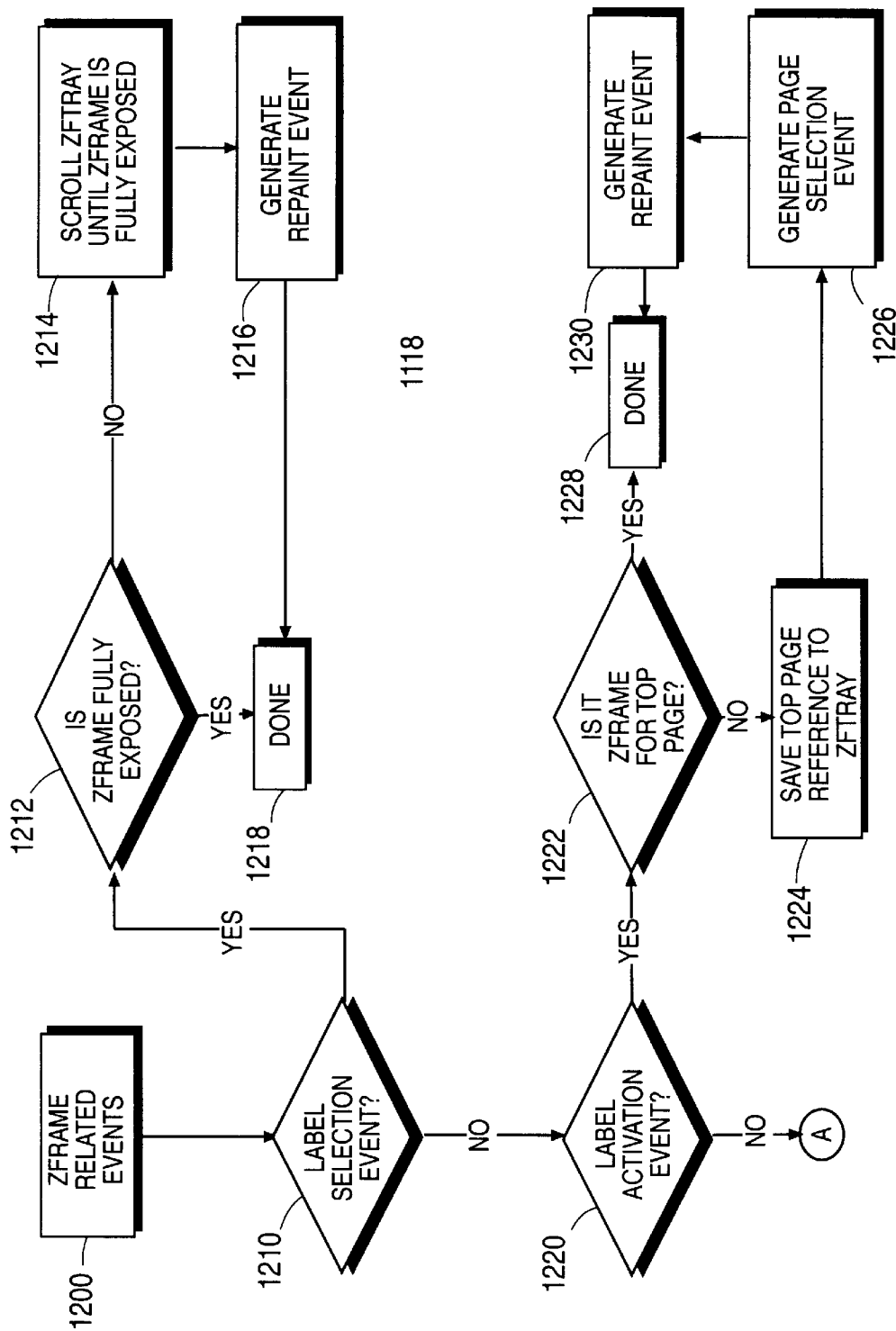
FIGS. 12A and 12B are flow diagrams illustrating Zframe related routines of one embodiment of the present invention.
Figure 12B:
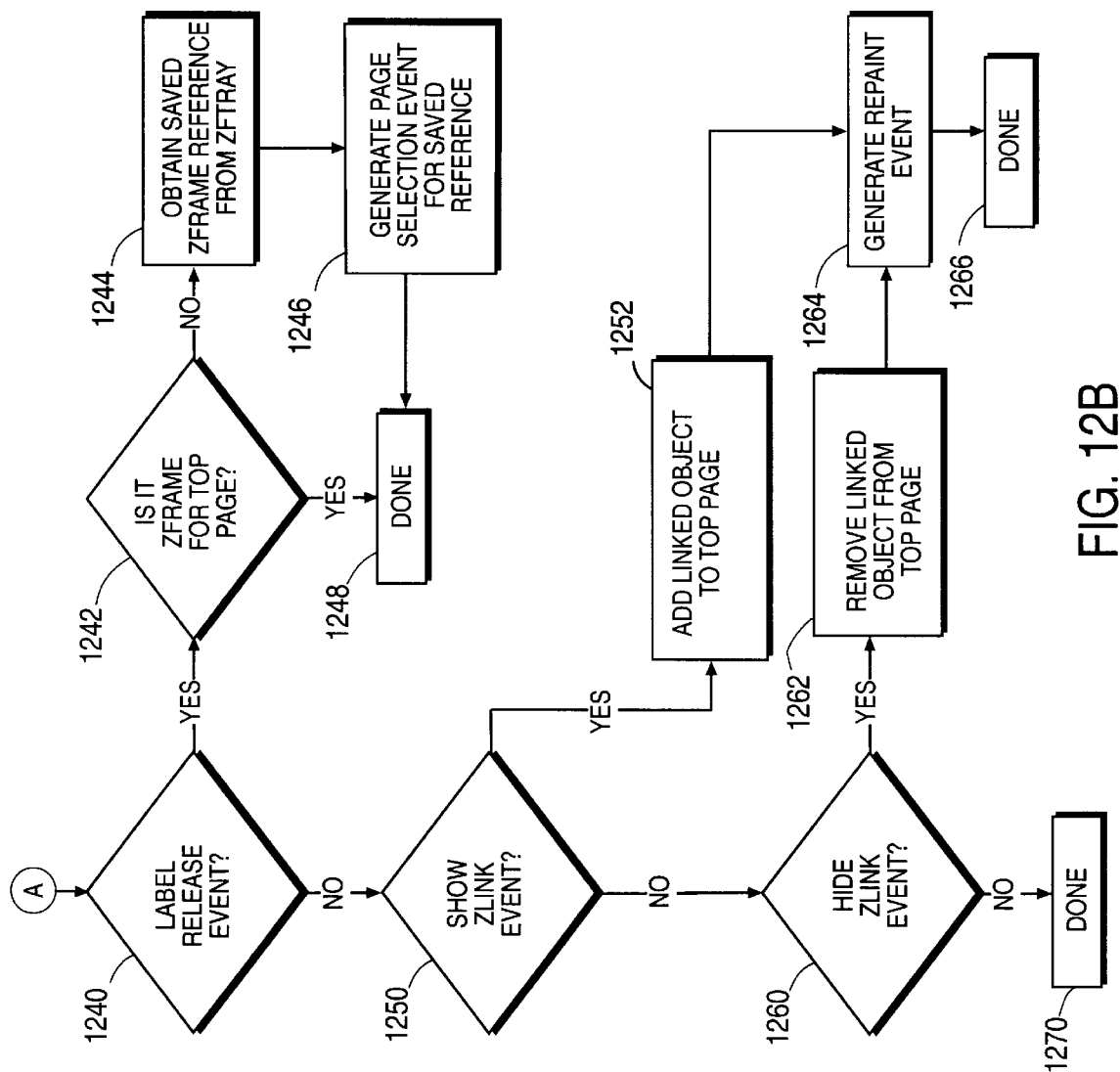

FIGS. 12A and 12B are flow diagrams illustrating Zframe related routines of one embodiment of the present invention In the method of FIG. 4, when the invention related event is a Zframe event, after step 412 the method continues at step 1200 at the start of the FIG. 12 flow diagram.

At step 1210, the system determines whether the Zframe event is a label selection event. In one embodiment, clicking on a label with a single click of a user input device selects a Zframe. The label selection routine ensures that when a Zframe is selected it becomes completely displayed on the screen, if it is not so displayed already. If the event is a label selection event, then the method continues at step 1212. At step 1212, the system determines whether the selected Zframe is fully exposed.

As described in relation to step 546, Zframes can be scrolled in the ZFtray 324 by a user independent of the page displayed on the client surface 304 illustrated in FIG. 3D. This allows users to easily move or copy objects from the exposed page to any other page in the tabbed notebook. The scrollability of Zframes also may require the system to adjust the position of the Zframes to fully display a given Zframe. If the Zframe is fully exposed then the method exits the Zframe event routine at step 1218.

If the selected Zframe is not fully exposed, then at step 1214 the system scrolls the Zframes in ZFtray 324 until the selected Zframe is fully exposed When the selected Zframe is fully exposed, the system generates a repaint event at step 1216 and then exits the Zframe event routine at step 1218.

After step 1210, if the event is not a label selection event then the method continues at step 1220. At step 1220, the system determines whether the Zframe event is a label activation event. A user can activate a Zframe by, for example, clicking an input device on a Zframe and holding down the button. When a Zframe is activated, the corresponding notebook page is displayed. If the event is a label activation event, then the method continues at step 1222. At step 1222, the system determines whether the label to be activated corresponds to the Zframe for the top page in the tabbed notebook. If so then the method exits the Zframe event routine at step 1228. If the label to be activated does not correspond to the Zframe for the top page, then at step 1224 the system saves the top page reference to ZFtray 324. At step 1226, the system generates a page selection event. At step 1230, the system generates a repaint event and then exits the Zframe event routine at step 1228.

After step 1220, if the event is not a label activation event then the method continues at step 1240. At step 1240, the system determines whether the Zframe event is a label release event. When a Zframe is activated by clicking an input device on a Zframe and holding down the button, the Zframe can be released by releasing the input device button. When the input device button is released the pre-activation state is restored. If the event is a label release event, then the method continues at step 1242. At step 1242, the system determines whether the label release event corresponds to the Zframe for the top page. If so then the method exits the Zframe routine at step 1248. If the label release event does not correspond to the Zframe for the top page, then the method continues at step 1244. At step 1244, the system obtains the saved Zframe reference from the ZFtray. At step 1246, the system generates a page selection event for the saved reference. The system then exits the Zframe routine at step 1248. The second Zframe reference need not be saved in the ZFtray program structure, but that is a convenient place to store it.

After step 1240, if the event is not a label release event then the method continues at step 1250. At step 1250, the system determines whether the Zframe event is a show Zlink event. If the event is a show Zlink event, then the method continues at step 1252. At step 1252, the system adds the linked object to the top page of the tabbed notebook. At step 1264, the system generates a repaint event to display the linked object. Then at step 1266, the method exits the Zframe event routine.

After step 1250, if the event is not a show Zlink event then the method continues at step 1260. At step 1260, the system determines whether the Zframe event is a hide Zlink event. If not then the method exits the Zframe event routine at step 1270. If the event is a hide Zlink event, then the method continues at step 1262. At step 1262, the system removes the linked object from the top page. The system then generates a repaint event at step 1264 and exits the Zframe event routine at step 1266.

The present invention provides a flexible intuitive user interface to store and manipulate data. The present invention has wide ranging application including, for example, in interfaces for database systems, object oriented programming development systems, and spreadsheets.

In the spreadsheet environment, data moved from one page to another using a Zframe can be placed in a default location. Alternatively a catch basin area on the display can be used to display cells that have been moved to a page that does not contain the corresponding logical cell position in the grid.

Thus a method and apparatus for graphically manipulating objects have been described. Although the present invention has been described with respect to certain specific embodiments, it will be clear to those skilled in the art that the inventive features of the present invention are applicable to other embodiments as well, all of which are intended to fall within the scope of the present invention.

I claim:

1. An apparatus for manipulating graphical objects in a notebook having a plurality of pages, wherein one of said plurality of pages is displayed as an exposed page, comprising:

a plurality of icons wherein each of said plurality of icons corresponds to a page in the notebook;

a moving means for moving a first object from a first page to a destination page when said first object is selected, placed on a first icon of said plurality of icons, wherein said first icon corresponds to said destination page, and released on said first icon;

a tray, wherein said plurality of icons are displayed in said tray;

a copying means for copying a second object from a first page to a destination page when said second object is selected to be copied, and is released on a third icon of said plurality of icons, wherein said third icon corresponds to said destination page;

a link display means for displaying links between objects on the exposed page in the notebook;

a hidden link display means for displaying links between a third object and objects on pages other than the exposed page, when said third object is selected for display of hidden links;

wherein, when said third object is selected for display of hidden links, a visual property of any of said plurality of icons that are visible and that correspond to pages that contain objects that are linked to said third object, is distinct from icons that correspond to pages that do not contain objects linked to said third object.

2. The apparatus of claim 1 further comprising a page display means for displaying said exposed page in said notebook, wherein said page display means displays a page corresponding to a second icon while said second icon is selected.

3. The apparatus of claim 1 wherein each of said plurality of icons comprises a label and a client area.

4. The apparatus of claim 1 further comprising a scrolling means for scrolling said plurality of icons in said tray independent of what page is displayed in said notebook.

5. The apparatus of claim 4 wherein a display of said plurality of icons is updated, when a new exposed page is selected, to display an icon that corresponds to the new exposed page.

6. The apparatus of claim 1 wherein said apparatus creates an icon when each new page is created, wherein the created icon corresponds to the new page, and deletes an icon that corresponds to each deleted page when a page is deleted from the notebook.

7. An apparatus for manipulating graphical objects in a notebook having a plurality of pages, wherein one of said plurality of pages is displayed as an exposed page, comprising:

a plurality of icons wherein each of said plurality of icons corresponds to a page in the notebook;

a moving means for moving a first object from a first page to a destination page when said first object is selected, placed on a first icon of said plurality of icons, wherein said first icon corresponds to said destination page, and released on said first icon;

a tray, wherein said plurality of icons are displayed in said tray;

a copying means for copying a second object from a first page to a destination page when said second object is selected to be copied, and is released on a third icon of said plurality of icons, wherein said third icon corresponds to said destination page;

a link display means for displaying links between objects on the exposed page in the notebook;

a hidden link display means for displaying links between a third object and objects on pages other than the exposed page, when said third object is selected for display of hidden links;

wherein, when said third object is selected, objects that are linked to said third object and that are contained in pages other than the exposed page, are displayed differently from objects that are linked to said third object and contained in the exposed page.

8. An article of manufacture comprising:

a computer usable medium having computer readable program code embodied therein for allowing graphical manipulation of objects in a notebook having a plurality of pages, wherein one of said plurality of pages is displayed as an exposed page, the computer readable program code in said article of manufacture comprising:

computer readable program code configured to cause a computer to display a plurality of icons, wherein each of said plurality of icons corresponds to a page in the notebook;

computer readable program code configured to cause a computer to move a first object from a first page to a destination page in the notebook when said first object is selected, placed on a first icon of said plurality of icons, wherein said first icon corresponds to said destination page, and released on said first icon computer readable program code configured to cause a computer to display said plurality of icons in a tray;

computer readable program code configured to cause a computer to copy a second object from a first page to a destination page in the notebook, when said second object is selected to be copied, and is released on a third icon of said plurality of icons, wherein said third icon corresponds to said destination page;

computer readable program code configured to cause a computer to display links between objects on the exposed page in the notebook;

computer readable program code configured to cause a computer to display links between a third object and objects on pages other than the exposed page, when said third object is selected for display of hidden links;

computer readable program code configured to cause a computer, when said third object is selected for display of hidden links, to display any of said plurality of icons that are visible and that correspond to pages that contain objects that are linked to said third object differently from icons that correspond to pages that do not contain objects linked to said third object.

9. The article of manufacture of claim 8 further comprising:

computer readable program code configured to cause a computer to display a page that corresponds to a second icon of said plurality of icons when said second icon is selected;

computer readable program code configured to cause a computer to display, when said second icon is released, a page displayed before said page that corresponds to said second icon was displayed.

10. The article of manufacture of claim 8 further comprising computer readable program code configured to cause a computer to display each of said plurality of icons as comprising a label and a client area.

11. The article of manufacture of claim 8 further comprising computer readable program code configured to cause a computer to scroll said plurality of icons in said tray independent of what page is exposed in said notebook.

12. The article of manufacture of claim 11 further comprising computer readable program code configured to cause a computer to update a display of said plurality of icons, when a new exposed page is selected, to display an icon that corresponds to the new exposed page.

13. The article of manufacture of claim 8 further comprising computer readable program code configured to cause a computer to:

create an icon, when each new page is created, wherein the created icon corresponds to the new page;

delete an icon that corresponds to each deleted page when a page is deleted from the notebook.

14. An article of manufacture comprising:

a computer usable medium having computer readable program code embodied therein for allowing graphical manipulation of objects in a notebook having a plurality of pages, wherein one of said plurality of pages is displayed as an exposed page, the computer readable program code in said article of manufacture comprising:

computer readable program code configured to cause a computer to display a plurality of icons, wherein each of said plurality of icons corresponds to a page in the notebook;

computer readable program code configured to cause a computer to move a first object from a first page to a destination page in the notebook when said first object is selected, placed on a first icon of said plurality of icons, wherein said first icon corresponds to said destination page, and released on said first icon computer readable program code configured to cause a computer to display said plurality of icons in a tray;

computer readable program code configured to cause a computer to copy a second object from a first page to a destination page in the notebook, when said second object is selected to be copied, and is released on a third icon of said plurality of icons, wherein said third icon corresponds to said destination page;

computer readable program code configured to cause a computer to display links between objects on the exposed page in the notebook;

computer readable program code configured to cause a computer to display links between a third object and objects on pages other than the exposed page, when said third object is selected for display of hidden links;

computer readable program code configured to cause a computer, when said third object is selected for display of hidden links, to display objects that are linked to said third object and that are contained in pages other than the exposed page differently from objects that are linked to said third object and contained in the exposed page.

15. A method for manipulating objects in a notebook, having a plurality of pages, wherein one of said plurality of pages is displayed as an exposed page, comprising the steps of:

displaying a plurality of icons, wherein each of said plurality of icons corresponds to a page in the notebook;

moving a first object from a first page to a destination page in the notebook by selecting said first object, placing said first object on a first icon of said plurality of icons, wherein said first icon corresponds to said destination page, and releasing said first object on said first icon;

displaying a page that corresponds to a second icon of said plurality of icons when said second icon is selected;

displaying, when said second icon is released, the page displayed before said page that corresponds to said second icon was displayed.

16. An apparatus for manipulating graphical objects in a tabbed notebook having a plurality of pages, and a plurality of tabs that correspond to the pages of the tabbed notebook, wherein one of said plurality of pages is displayed as an exposed page, comprising:

a plurality of icons, in addition to said tabs, wherein each of said plurality of icons corresponds to a page in the tabbed notebook;

a moving means for moving a first object from a first page to a destination page when said first object is selected, placed on a first icon of said plurality of icons, wherein said first icon corresponds to said destination page, and released on said first icon.

17. The apparatus of claim 16 further comprising a page display means for displaying said exposed page in said notebook, wherein said page display means displays a page corresponding to a second icon while said second icon is selected.

* * * * *